(12) United States Patent
Spahlinger

(10) Patent No.: US 7,490,015 B2
(45) Date of Patent: Feb. 10, 2009

(54) METHOD FOR CONTROLLING/REGULATING A PHYSICAL QUANTITY OF A DYNAMIC SYSTEM, IN PARTICULAR A MICROMECHANICAL SENSOR

(75) Inventor: Guenter Spahlinger, Stuttgart (DE)

(73) Assignee: LITEF GmbH, Freiburg (DE)

( * ) Notice: Subject to any disclaimer, the term of this patent is extended or adjusted under 35 U.S.C. 154(b) by 0 days.

(21) Appl. No.: 11/667,513

(22) PCT Filed: Nov. 21, 2005

(86) PCT No.: PCT/EP2005/012449

§ 371 (c)(1),
(2), (4) Date: May 9, 2007

(87) PCT Pub. No.: WO2006/056389

PCT Pub. Date: Jun. 1, 2006

(65) Prior Publication Data

US 2007/0286294 A1      Dec. 13, 2007

(30) Foreign Application Priority Data

Nov. 24, 2004   (DE) ..................... 10 2004 056 699

(51) Int. Cl.
*G06F 19/00* (2006.01)
(52) U.S. Cl. .................. 702/104; 331/66; 331/154; 331/177 R; 363/34
(58) Field of Classification Search .............. 702/33, 702/85, 81, 105, 104, 106; 331/65, 154, 331/177 R, 175, 167; 363/34
See application file for complete search history.

(56) References Cited

U.S. PATENT DOCUMENTS

| | | | | |
|---|---|---|---|---|
| 5,847,943 | A   * | 12/1998 | Vogel         | 363/37 |
| 6,229,277 | B1 * | 5/2001  | Hakala et al. | 318/629 |
| 6,995,622 | B2 * | 2/2006  | Partridge et al. | 331/66 |
| 7,221,230 | B2 * | 5/2007  | Partridge et al. | 331/66 |
| 7,224,236 | B2 * | 5/2007  | Partridge et al. | 331/66 |
| 2005/0151592 | A1* | 7/2005  | Partridge et al. | 331/16 |
| 2006/0022764 | A1* | 2/2006  | Partridge et al. | 331/177 R |
| 2006/0033589 | A1* | 2/2006  | Partridge et al. | 331/154 |

FOREIGN PATENT DOCUMENTS

WO      04099716      11/2004

* cited by examiner

*Primary Examiner*—Carol S Tsai
(74) *Attorney, Agent, or Firm*—Elliott N. Kramsky

(57) ABSTRACT

A method for controlling/regulating a physical variable of a dynamic system to a specific desired value profile with use made of a pulse modulator that generates a sequence of discrete modulation signals that affect the control or regulation of the physical variable. The method involves repeated execution of: determining an exact value or an approximation for the deviation between the momentary desired value and the momentary actual value of the physical variable; determining the respective change in the deviation which would result from the maintenance of the momentary modulation signal or the switching over to the other modulation signals; and generating that modulation signal which results in the best approximation of the momentary desired value.

16 Claims, 13 Drawing Sheets

METHOD FOR CONTROLLING/REGULATING A PHYSICAL QUANTITY OF A DYNAMIC SYSTEM, IN PARTICULAR A MICROMECHANICAL SENSOR

BACKGROUND

1. Field of the Invention

The present invention relates to methods and devices for controlling or regulating physical variables of systems. More particularly, this invention pertains to methods and devices for controlling or regulating dynamic systems employing phase modulators.

2. Description of the Prior Art

Micromechanical sensors comprise known art. Coriolis gyroscopes (a.k.a. "vibration gyroscopes"), normally employed to measure rotational speeds, are prominent examples of such sensors. Such gyroscopes include a mass system that is caused to vibrate. The vibration is normally the superposition of a multiplicity of individual vibrations that are initially independent of each other and can be regarded in the abstract in each case as "resonators". At least two resonators are required for gyroscope operation. A first resonator is artificially excited to vibrate ("excitation vibration"). The second resonator is then excited to vibrate when the Coriolis gyroscope is moved or rotated. In such a situation, Coriolis forces occur that couple the first resonator to the second resonator, extracting energy from the excitation vibration of the first resonator and transferring that energy to the readout vibration of the second resonator ("readout vibration"). In order to determine movements (e.g. rotations) of the Coriolis gyroscope, the readout vibration is picked up and a corresponding readout signal ("readout vibration pick-off signal") is examined to ascertain whether changes in amplitude of the readout vibration, which represent a measure of rotation of the Coriolis gyroscope, have occurred. Coriolis gyroscopes can be implemented as both open-loop and closed-loop systems in which the amplitude of readout vibration is continuously reset to a fixed value (preferably zero) by means of a control loop.

In the discussion that follows, "resonator" should be understood to refer to a vibratory mass system (possibly including mechanical springs) while "vibrator" is employed as a synonym for this.

Reference is made, for example, to German patent application DE 102 48 733 A1 for a detailed discussion of Coriolis gyroscope functionality. A disadvantage of existing Coriolis gyroscopes such as that described in DE 102 48 733 A1 is that a plurality of digital-analog converters is required to generate corresponding force impulses from the digital reset or regulating signals. Digital-analog converters are expensive, require considerable electrical power and are relatively unsuitable for integration with other electronic components, thereby limiting miniaturization.

SUMMARY OF THE INVENTION

The invention addresses the preceding shortcomings of the prior art by providing, in a first aspect, a method for controlling/regulating a physical variable of a physical system (in particular a dynamic system) to a specific desired value/desired value profile. A pulse modulator generates a sequence of discrete modulation signals. Such signals affect the control/regulation of the physical variable.

The method repeatedly executes a series of steps that include determining an exact value or an approximation for the deviation between the momentary desired value and the momentary actual value of the physical variable. The respective change in the deviation that would result from maintenance of the momentary modulation signal or the switching over to the other modulation signals is determined. The modulation signal that results in the best approximation of the momentary desired value is then generated.

In a second aspect, the invention provides a device for controlling/regulating a physical variable of a physical system, in particular, a dynamic system, to a specific desired value/desired value profile. Such a device features a pulse modulator for generating a sequence of discrete modulation signals that affect the control/regulation of the physical variable.

The device includes a comparison unit for determining an exact value or an approximation for the deviation between the momentary desired value and the momentary actual value of the physical variable. A calculation unit is provided that is connected to the comparison unit for calculating the relevant changes in deviation, as determined by the comnparison unit, that would result from maintenance of the momentary modulation signal or the switching over to the other modulation signals. A decision unit is connected to the calculation unit. Such unit, in response to deviation changes calculated by the comparison unit, decides which modulation signal results in the best approximation of the momentary desired value. The modulation signal sequence generated by the pulse modulator is controllable by the decision unit.

In a third aspect, the invention provides a method for simultaneously controlling/regulating at least two physical variables of a physical system, in particular a dynamic system, to specific desired values/desired value profiles. Such method uses a pulse modulator that generates a sequence of discrete modulation signals with the sequence affecting the control/regulation of the physical variables.

In the method, an effective total deviation is first calculated for each generatable modulation signal. The total deviation is obtained from the sum of the exact values or the approximations for the deviations between the momentary desired values and corresponding actual values of the physical variables that would result from the maintenance of this modulation signal or the switching over to this modulation signal. The modulation signal that has the smallest calculated effective total deviation is then used for regulation, and the process is then iteratively repeated.

In a fourth aspect, the invention provides an entity for simultaneously controlling/regulating at least two physical variables of a physical system, in particular a dynamic system, to specific desired values/desired value profiles. The entity includes a pulse modulator for generating a sequence of discrete modulation signals that affect the control/regulation of the physical variables.

The entity includes a calculation unit that calculates an effective total deviation derived from the sum of the exact values or the approximations for the deviations between the momentary desired values and corresponding actual values of the physical variables, which would result from the maintenance of this modulation signal or the switching over to this modulation signal for each generatable modulation signal.

A decision unit is provided that is connected to the calculation unit. Depending on the effective total deviations calculated by the calculation unit, it decides which modulation signal would result in the smallest calculated effective total deviation. The modulation signal sequence generated by the pulse modulator is controlled by the decision unit.

The preceding and other features of the invention will become further apparent from the detailed discussion that follows. Such discussion is accompanied by a set of drawing figures in which numerals point to the features of the invention. Numerals of the drawing figures refer to those of the written specification with like numerals referring to like features throughout both the drawing figures and the written text.

DETAILED DESCRIPTION OF THE PREFERRED EMBODIMENT

Figure 1:
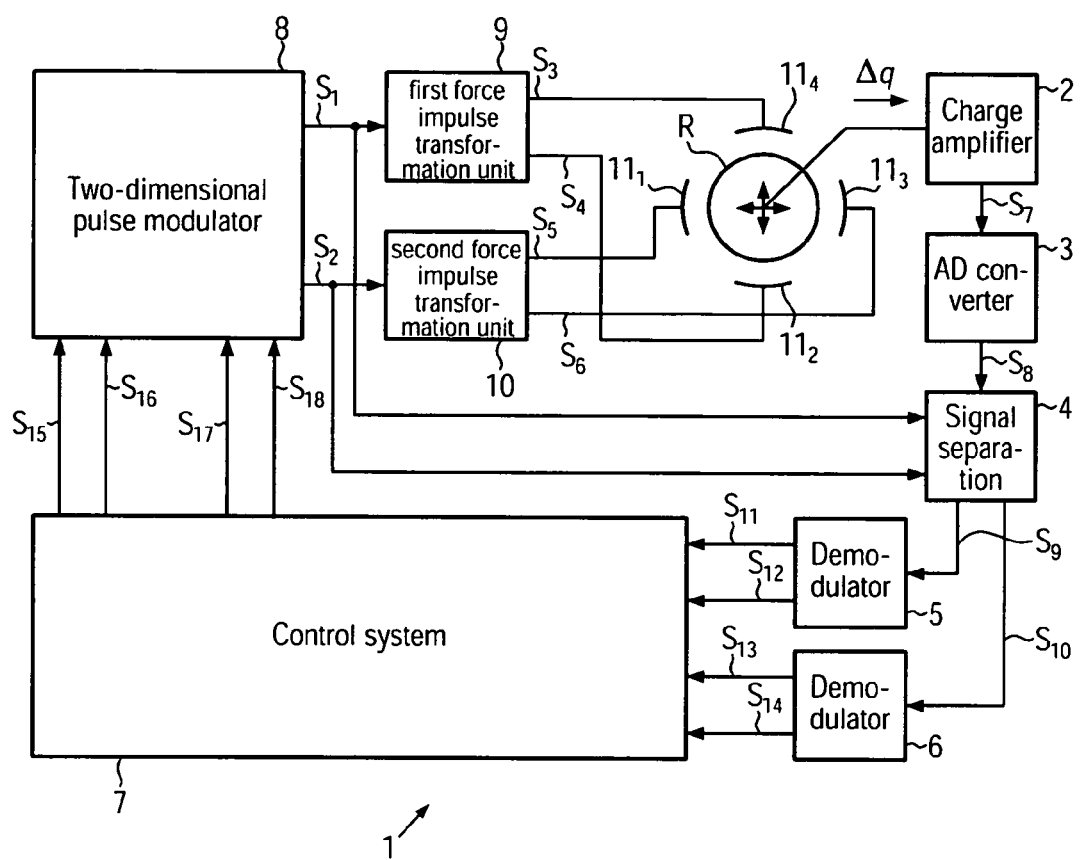
FIG. 1 is a schematic diagram of an electronic evaluation/control system of a Coriolis gyroscope including a pulse modulator.

A Coriolis gyroscope in which digital-analog converters are replaced by pulse modulators so that quantized output signals of the pulse modulator are then employed rather than the analog output of the digital-analog converters and is explained in greater detail below with reference to the block diagram of FIG. 1.

An electronic evaluation/control system includes a charge amplifier 2, an analog/digital converter 3, signal separation 4, a first demodulator 5, a second demodulator 6, a control system 7, a two-dimensional pulse modulator 8, first and second force impulse transformation units 9, 10, and first through fourth force generator electrodes $11_1$-$11_4$. The components identified by the reference numerals 2 to 11 form two control loops, one for setting the amplitudes, frequencies and phases of the excitation vibration and the other for setting the amplitudes, frequencies and phases of the readout vibration.

As shown in FIG. 1, the circuit of the invention includes only an analog-digital converter 3 and is without a digital-analog converter. Digital-analog converters are replaced by the two-dimensional pulse modulator 8 and the two force impulse transformation units 9, 10.

The two-dimensional pulse modulator 8 generates first and second ternary quantized output signals $S_1$, $S_2$, to set the amplitudes, frequencies or phases of the excitation vibration/readout vibration of the resonator R. The first ternary quantized output signal $S_1$ is transformed into force impulse signals (voltage signals) $S_3$, $S_4$ in the first force impulse transformation unit 9 while the second ternary quantized output signal $S_2$ is transformed into force impulse signals (voltage signals) $S_5$, $S_6$ by the second force impulse transformation unit 10. The ternary quantized output signals $S_1$, $S_2$ preferably assume the values 1, 0 and −1 in each case. When the value of the signal $S_1$ is +1, for example, the first force impulse transformation unit generates two force impulse signals $S_3$, $S_4$, that cause a force impulse, from the signal $S_1$. Such force impulse signals $S_3$, $S_4$ generate electrical fields between the second and fourth force generator electrodes $11_2$, $11_4$ and the resonator R, via which the force impulses are effected. When the value of the signal $S_1$ is −1, the resultant force impulse signals $S_3$, $S_4$ are such that the orientation of resulting force impulses is opposite that of the force impulses which are generated when $S_1$=1. Should the signal $S_1$ have the value 0, no electrical fields, or two reciprocally balanced electrical fields, are present between the force generator electrodes $11_2$, $11_4$ and the resonator R. Each force impulse is therefore the result of a single electrical field which is present either between the force generator electrode $11_2$ and the resonator R or between the force generator electrode $11_4$ and the resonator R.

The following table, for example, discloses the potentials (0 or $U_0$) that are therefore found at the second and fourth force generator electrodes $11_2$, $11_4$:

| $S_1$ | $11_4$ | $11_2$ |
|---|---|---|
| −1 | 0 | +/−$U_0$ |
| 0 | 0 or +/−$U_0$ | 0 or +/−$U_0$ |
| 1 | +/−$U_0$ | 0 |

Should the potential $U_0$ have a negative operational sign, the resulting force is always positive due to the quadrature of the potential. Corresponding considerations apply to the second ternary quantized output signal $S_2$ that is transformed by the second force impulse transformation unit 10 into fifth and sixth force impulse signals $S_5$, $S_6$, which are applied at the first and third force generator electrodes $11_1$, $11_3$. For example, the parameters of the excitation vibration are set/controlled via the force generator electrodes $11_2$, $11_4$ and the parameters of the readout vibration are set/controlled via the force generator electrodes $11_1$, $11_3$.

The application of electrical fields to the force generator electrodes $11_1$ to $11_4$ causes electrical charge to flow to a moving central electrode in addition to excitation of the resonator R. This charge is measured by means of the charge amplifier 2. A corresponding analog output signal $S_7$ is transformed by the analog-digital converter 3 into a digital signal $S_8$, from which a first digital readout signal $S_9$ and a second digital readout signal $S_{10}$ are generated, by means of the signal separation 4. Since the charge that flowed onto the central electrode is dependent upon the capacitances of the force generator electrodes $11_1$ to $11_4$ (to which an electrical field is momentarily applied), the charge that flowed is a measure for the amplitudes, frequencies or other parameters of the excitation vibration/readout vibration of the resonator R. Therefore the momentary movement/change in movement of the resonator R can be reconstructed by the signal separation 4 depending on momentary and/or temporally older output signal values of the ternary quantized output signals $S_1$, $S_2$. If positive and negative potentials +/−$U_0$ occur, the signal separation 4 must also take into consideration the operational sign of the potential $U_0$ (the voltage present at the force generator electrodes $11_1$ to $11_4$) during the reconstruction.

The two-dimensional pulse modulator 8 is designed so that the ternary quantized output signals $S_1$ and $S_2$ never change at the same time as the charge flowing onto the central electrode is usually measured summarily (i.e. charge transfers resulting from a superimposition of two electrical fields can only be measured as a whole and therefore it is not possible to assign parts of the charge transfer to individual electrical fields). The additional condition between the ternary quantized output signals $S_1$ and $S_2$ makes it possible to obtain an unambiguous assignment of the flowed charge to a specific electrical field. It is therefore possible to distinguish precisely between excitation vibration and readout vibration. A further possible condition is to insure that only one of the two signals ($S_1$ and $S_2$) is allowed to assume a value other than zero at a given time.

The first digital readout signal $S_9$ is demodulated by the first demodulator 5 into a real part $S_{11}$ and an imaginary part $S_{12}$. Similarly, the second digital readout signal $S_{10}$ is demodulated by the second demodulator 6 into a real part $S_{13}$ and an imaginary part $S_{14}$. The first digital readout signal $S_9$ contains information about the excitation vibration and the second digital readout signal $S_{10}$ contains information about the readout vibration, for example. The real and imaginary parts $S_{11}$ through $S_{14}$ of the first and second digital readout signal $S_9$, $S_{10}$ arrive at the control system 7 that generates excitation/compensation signals $S_{15}$ through $S_{18}$. For example, the signal $S_{15}$ represents the real part and the signal $S_{16}$ represents the imaginary part of the digital excitation/compensation signal for the excitation vibration, while the signal $S_{16}$ represents the real part and the signal $S_7$ the imaginary part of a digital excitation/compensation signal for the readout vibration. The digital excitation/compensation signals $S_{15}$ to $S_{18}$ are applied to the two-dimensional pulse modulator 8 that generates the ternary quantized output signals $S_1$, $S_2$.

The above-described control principle (i.e. use of a digital impulse sequence to regulate a physical variable) is not limited to control of excitation vibration/readout vibration. It can also be applied in a multiplicity of different ways. In micromechanical sensors ("MEMS": micro-electromechanical systems) featuring electrostatic excitation or resetting of a resonator (in the above-described Coriolis gyroscope, for example), it is frequently necessary to set the resonance frequency of the resonator to a predetermined value. This can be achieved using electrostatic reset springs whose (positive or negative) spring constants can be set by electrical voltages. The resonator is generally composed of mechanical springs (preferably connected in parallel). The vibratory mass system and the vibratory mass element itself are suspended onto the resonator. The resonance frequency of such a resonator can be set by the control system explained with reference to FIG. 1. This means that, in place of an analog settable voltage, a digital impulse sequence is generated that "trims" the resonance frequency to a value corresponding to the average of the impulses. For example, it is possible to set a natural resonance of 9100 Hz by a corresponding switching sequence of the electrostatic reset springs at natural resonances of 9000 Hz and 9200 Hz (i.e. by means of a corresponding impulse sequence comprising two impulse values). As mentioned above, this has the advantage of omitting expensive digital-analog converters that consume relatively large amounts of power. It is therefore possible to regulate, or set, the resonance frequency of a resonator (e.g. the resonator of FIG. 1 or a double resonator) using discrete impulses. Separate control loops and separate force generator electrodes (not shown in FIG. 1) can be employed for this purpose. During the reconstruction routine, the signal separation of FIG. 1 would then additionally require consideration of the signals/force generator electrodes required for regulating the resonance frequency.

It can be shown that it is not sufficient to select a simple distribution method that insures that the average frequency of the impulses corresponds to the relative position of the desired natural frequency within the switchable natural frequency extreme values to regulate/set the resonance frequency to a specific value. In fact, this would result in the vibratory mass element experiencing uncontrolled amplitude and phase fluctuations due to the so-called parametric oscillator effect. In extreme cases this could lead to a deattenuation, or even an unstable behavior, of the resonator ("parametric effects"). This applies analogously to any physical variables which are set/regulated to a specific value by means of a discrete impulse sequence.

The invention addresses the problem of specifying a method for controlling/regulating a physical variable of a micromechanical sensor (or, more generally, of a dynamic system) using a pulse modulator. Such method allows suppression of parametric effects that might occur. In particular, provision is made for a method for digitally regulating the spring constants of a resonator to a predetermined resonance frequency while simultaneously suppressing parametric effects.

The method of the invention for controlling or regulating a physical variable of a dynamic system to a specific desired value or desired value profile utilizes a pulse modulator, which generates a sequence of discrete modulation signals effecting the control or regulation of the physical variable, and is characterized by the repeated execution of the following steps:

a) Firstly an exact value or an approximation of the deviation between the momentary desired value and the momentary actual value of the physical variable is determined.
b) The relevant change in the deviation which would result from the maintenance of the momentary modulation signal or the switching over to the other modulation signals is then determined.
c) Finally, that modulation signal is selected which would result in the best approximation of the momentary desired value.

As a result of the repeated execution of the steps (a) to (c), the control or regulation of the physical variable to the desired value or desired value profile is effected.

An important principle that underlies the method of the invention is that, in each iteration step, the effects of all generatable modulation signals on the momentary actual value of the physical variable (or on the actual value of the physical variable as estimated by means of the approximation) are determined. That is, the effects of the individual modulation signals are simulated before the pulse modulator actually generates a corresponding modulation signal and therefore influences the momentary value of the physical variable. The modulation signal is selected which has the "best" effect on the physical variable in the simulation (i.e. results in the best approximation of the momentary desired value). The advantage of such a controlling/regulating method is that it can easily be combined with corresponding controlling/regulating methods for other physical variables and, at the same time, prevent a suppression of parametric effects.

The method of the invention can be applied with particular advantage to micromechanical sensors that include a resonator. In such case, the physical variable to be controlled or regulated could be the resonance frequency of the resonator. Alternatively, the amplitude or phase of vibration of the resonator could also be controlled or regulated. The invention can also be applied on dynamic systems such as pendulums in accelerometers, and in oscillators (electrical, electromechanical, mechanical) having a settable frequency (e.g. for generating a clock frequency). Other suitable systems include settable band filters, quartz filters, and the like. All relevant physical variables employed in connection with such systems can be regulated by the method of the invention.

Either the exact value of the deviation or an approximation of the deviation between the momentary desired value and the momentary actual value of the physical variable can be determined. It is advantageous to determine an approximation of the deviation for regulating the resonance frequency of the resonator. The reason for this is that, in a micromechanical sensor with reset (closed-loop system), the amplitude of a resonator readout vibration, which must be controlled, is continuously reset to zero. Consequently, no vibration can be examined and, thus, neither can momentary resonance frequency be read. This problem may be solved in that, to regulate the resonance frequency of the resonator, the resonator vibration response that would result from the arrival of a modulation signal sequence at the resonator (assuming a defined initial amplitude and phase) is simulated, and the modulation signal sequence selected so that a maximally accurate approximation of a desired value profile for resonator vibration is produced in the simulation. In this context, the frequency of the desired value profile for the resonator vibration is the resonance frequency that must be controlled. The "genuine" resonator is exposed to the modulation signal sequence thereby obtained.

"Vibration response" refers to the reaction of the resonator to the modulation signal sequence, i.e. the natural vibration of the resonator (die-away process) that results from the modulation signal sequence. It should be understood that with regard to the die-away process embodied in the simulation that the resonator experiences an initial deflection in the simulation initial amplitude and phase. It is then left alone, and, although the modulation signal sequence (whose effect on the die-away process is tested in the simulation) regulates the phase and amplitude of the decaying (attenuated) die-away process (to the ideal desired value), it has "nothing to do" with the phase and amplitude of the initial deflection. This is an "outline condition" and independent of the modulation signal sequence.

Therefore, the attenuated decaying natural vibration process of the real resonator is simulated in response to a modulation signal sequence, and in each iteration or time step (time-discrete digital modulation method) the vibration response that results from the previous modulation signals is compared with an ideal natural vibration that the system would exhibit in the case of the resonance frequency that must be regulated. The effects of all generatable modulation signals on the momentary vibration state of the simulated real resonator are determined. In the next iteration step the resonator in the simulation is exposed to the modulation signal. This results in the best approximation of the ideal desired value profile for the vibration. That is, this produces the best match between ideal (natural) vibration profile and simulated real (natural) vibration profile.

The generation of the modulation signal sequence for regulating resonance frequency can be achieved, for example, by simultaneously controlling amplitude and phase of the vibration response (natural vibration) to specific desired values or desired value profiles in simulation of the vibration behavior of the real resonator. For this d) An effective total deviation is calculated for each generatable modulation signal, said total deviation being obtained from the sum of the deviations between the momentary values as regulated in the simulation, which would result from the maintenance of this modulation signal (if this modulation signal was selected in the previous iteration step) or the switching over to this modulation signal (if a different modulation signal was selected in the previous iteration step).
e) That modulation signal is selected for which the calculated effective total deviation is smallest.
f) The steps d) and e) are iteratively repeated, i.e. step d) and then step e) are executed once in each iterative step.

When generating the modulation signal sequence, two physical variables (amplitude and phase) are simultaneously taken into consideration. The "effective total deviation" is therefore a "global" error which represents the sum of the phase errors and amplitude errors for a generatable modulation signal. Because the "global" error is kept as small as possible, priority of regulation is always given to that physical variable which contributes most to the total deviation, i.e. has the greatest "regulation need".

If amplitude and phase of the simulation are regulated to the idealized desired value profile for vibration in the manner described above, the preferred resonance frequency of the resonator is set "automatically".

To improve accuracy, it is appropriate to simulate two resonator vibration responses simultaneously (natural vibrations) that result from the arrival of a modulation signal sequence at the resonator. For each of the vibration responses, amplitude and phase of the vibration response are simultaneously regulated to specific desired values/desired value profiles. The desired phase of the one vibration response is shifted relative to the desired phase of the other vibration response by the phase $\pi/2$. In this case:

g) For each generatable modulation signal, an effective total deviation is assigned in each case to the two simulations, said total deviation being obtained from the sum of the deviations between the momentary desired values of the simulation and corresponding values as regulated in the simulation, which would result from the maintenance of this modulation signal (if this modulation signal was selected in the previous iteration step) or the switching over to this modulation signal (if a different modulation signal was selected in the previous iteration step).

h) The effective total deviation relative to the same modulation signal is added up from both simulations.

i) That modulation signal is selected for which the total as calculated in the previous step is smallest.

g) The steps g) to i) are each executed once in each iteration.

The invention further provides a method for simultaneously controlling or regulating at least two physical variables of a dynamic system to specific desired values or desired value profiles using a pulse modulator which generates a sequence of discrete modulation signals, said sequence effecting the control/regulation of the physical variables, and is characterized by the repeated execution of the following steps:

a) Firstly an effective total deviation is calculated for each generatable modulation signal, said total deviation being obtained from the sum of the exact values or the approximations for the deviations between the momentary desired values and corresponding actual values of the physical variables, which would result from the maintenance of this modulation signal (if this modulation signal was selected in the previous clock cycle) or the switching over to this modulation signal (if a different modulation signal was selected in the previous clock cycle).

b) That modulation signal for which the calculated effective total deviation is smallest is used for the control/regulation (in the next clock cycle).

c) As a result of the repeated execution of the steps a) and b), the control or regulation of the physical variables to corresponding desired values or desired value profiles is effected.

An important principle which underlies the method of the invention for controlling or regulating at least two physical variables of a dynamic system to specific deferred values or value profiles is that in each clock cycle (iteration step) the effects of all generatable modulation signals on the momentary actual values of the physical variables, or on the actual values of the physical variables as estimated by means of approximation, are determined. That is, the effects of the individual modulation signals are simulated before the pulse modulator actually generates a corresponding modulation signal. Therefore, they influence the momentary values of the physical variables. The modulation signal is selected that has the "best" effect on the physical variable in the simulation, i.e. results in the best approximation of the momentary desired value ("run through all possibilities" principle). The advantage of such a controlling/regulating method is that, in principle, an unlimited number of physical variables can be simultaneously regulated and parametric effects suppressed.

The method can be applied particularly advantageously to micromechanical sensors having a resonator. The physical variables to be controlled/regulated could be, for example, a resonance frequency of the resonator, or amplitudes or phases of the excitation vibration and/or readout vibration of the resonator.

As described above, in step a) it is possible to determine either the exact values of the deviations or approximations for the deviations between the momentary desired value and the momentary actual values of the physical variables. It is advantageous to determine an approximation of the deviation, for example, to regulate resonance frequencies of the resonator. The reason for this is that, in a micromechanical sensor with reset (closed-loop system), the amplitude of a readout vibration of the resonator, which must be regulated, is continuously reset to zero and, consequently, no vibration can be examined. Therefore, no momentary resonance frequency can be read. This problem can be solved if, when regulating the resonance frequency of the resonator, resonance frequency deviation approximations relating to this are ascertained as follows:

a natural vibration process of the resonator, which the resonator would execute under specific vibration initial conditions and after exposure to the modulation signals previously generated by the pulse modulator, is simulated, the effect which each generatable modulation signal would have on the simulated natural vibration process of the resonator is calculated, and the hypothetically resulting natural vibration profiles are compared with a natural vibration desired value profile which has the same vibration initial conditions and whose vibration frequency is the resonance frequency that must be regulated, wherein the deviations between the hypothetically resulting natural vibration profiles and the natural vibration desired value profile represent the resonance frequency deviation approximations that must be determined.

It is possible in general to determine deviation approximations of any physical variables or parameters of any systems (e.g. non-linear and/or time-dependent systems) by means of simulation, provided that a numerically simulatable model for these variables/parameters/systems can be found (e.g., regulation of an accelerometer). In principle, it would also be possible to regulate all relevant variables/parameters on the basis of simulation.

Accordingly, an attenuated decaying natural vibration process of the real resonator is simulated that depends on a modulation signal sequence. The natural vibration resulting from the previous modulation signals is compared in each iteration step or clock cycle, with an "ideal" natural vibration that an ideal system would exhibit in the case of the resonance frequency to be regulated. The effects of all generatable modulation signals on the momentary vibration state of the simulated real resonator are determined and, during the next clock cycle, the resonator of the simulation is exposed to the modulation signal for which the effective total deviation (for all physical variables that must be regulated simultaneously) is smallest.

Comparison of the hypothetically resulting natural vibration profiles with the natural vibration desired value profile can be achieved, for example, by comparing corresponding amplitudes and phases of the profiles with one other. In this case, a total deviation is calculated for each generatable modulation signal. The total deviation is obtained from the sum of the deviations between the momentary desired values and corresponding simulation values of amplitude and phase that would result from maintenance of or switching over to this modulation signal to this modulation signal. In this context, the total deviations represent the resonance frequency deviation approximations that must be determined.

When comparing the simulated natural vibration with the natural vibration desired value profile, two physical variables (amplitude and phase) are thus simultaneously taken into consideration. The term "total deviation" signifies a "global" error which, in this embodiment, represents the sum of phase errors and amplitude errors relative to a generatable modulation signal. Similarly, the "effective total deviation" signifies a global error, in which one part represents the total deviations determined in this embodiment. An additional further part of the global error results from the deviations of at least one physical variable that must be further regulated. Because the global error is kept as small as possible, priority of regulation is always given to that physical variable that contributes most to the effective total deviation (i.e. has the greatest "regulation need").

If the amplitude and phase of the simulation are "trimmed" to the idealized desired value profile for the natural vibration in the manner described above, the preferred resonance frequency of the resonator is also automatically set to the desired value.

In order to improve the accuracy of the method of the invention, it is possible to simulate two natural vibration processes of the resonator simultaneously. Each natural vibration process is compared with the relevant desired values/desired value profiles with respect to amplitude and phase, and the desired phase of the one natural vibration process is shifted relative to the desired phase of the other natural vibration process by π/2. In this case:

for each generatable modulation signal, a total deviation is assigned in each case to the two simulations, said total deviation being obtained from the sum of the deviations between the momentary desired values and corresponding simulation values for amplitude and phase, which would result from the maintenance of this modulation signal or the switching over to this modulation signal, and the total deviations relating to the same modulation signal from both simulations are added up, wherein the total deviation sums which were calculated in the previous step represent the resonance frequency deviation approximations which must be determined.

In order to allow better understanding of the invention, the following analysis briefly explains the theoretical principles of a mechanical system that includes a vibratory mass and how it can be represented as an analog or discrete system.

1. Analysis of the Mechanical Vibrator 1.1 Differential Equation

Assume a vibratory system, described by the mass m of the vibrator, attenuation constant d (in N(m/s) and the deflection-dependent return force (spring constant) k (in N/m). Let the deflection of the vibrator be $\tilde{s}_2$. The spring force $f_k$, the attenuation force $f_d$ and the acceleration force $f_b$ act on the vibrator. If an external force $\tilde{x}$ is now applied, a force equilibrium is established.

$$\tilde{x} = f_k + f_d + f_b \quad (1)$$

The forces on the right-hand side of equation (1) (internal forces) are dependent on the movement of the vibrator, i.e. on its deflection $\tilde{s}_2$ and the derivations thereof:

$$f_k = k\tilde{s}_2 \quad (2)$$

$$f_d = d\frac{d\tilde{s}_2}{dt} \quad (3)$$

$$f_b = m\frac{d^2\tilde{s}_2}{dt^2} \quad (4)$$

The following differential equation is therefore valid:

$$m\frac{d^2\tilde{s}_2}{dt^2} = \tilde{x} - k\tilde{s}_2 - d\frac{d\tilde{s}_2}{dt} \quad (5)$$

Let it be now assumed that T is (initially) any constant time. If the variables are now defined as follows:

$$\tilde{s}_1 = T\frac{d\tilde{s}_2}{dt} \quad (6)$$

$$\tilde{s}_0 = T^2\frac{d^2\tilde{s}_2}{dt^2} \quad (7)$$

the differential equation becomes $$\tilde{s}_0 = \tilde{x}\frac{T^2}{m} - \tilde{s}_2\frac{T^2 k}{m} - \tilde{s}_1\frac{Td}{m} \quad (8)$$

with the additional conditions:

$$\tilde{s}_1(t) = \frac{1}{T}\int_{-\infty}^{t}\tilde{s}_0(\tau)d\tau; \tilde{s}_2(t) = \frac{1}{T}\int_{-\infty}^{t}\tilde{s}_1(\tau)d\tau \quad (9)$$

1.2 Block Diagram

Figure 2:
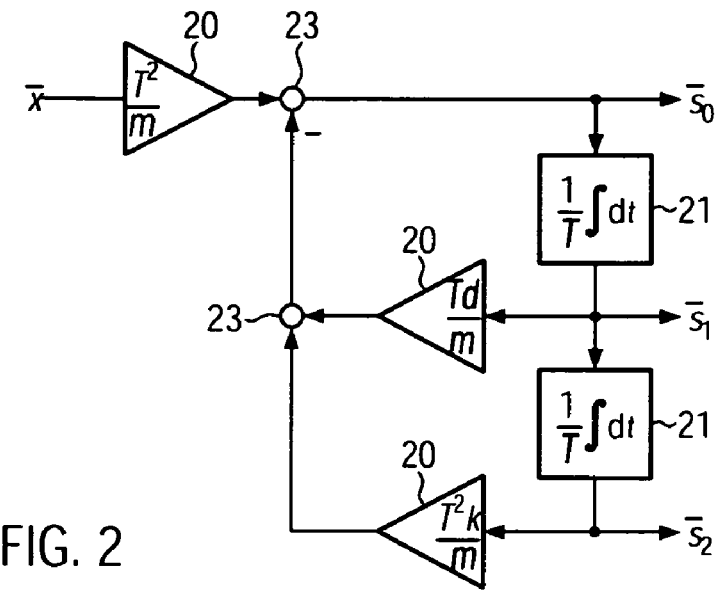
FIG. 2 is an emulation of a mechanical system having vibratory mass (continuous illustration)
Figure 3:
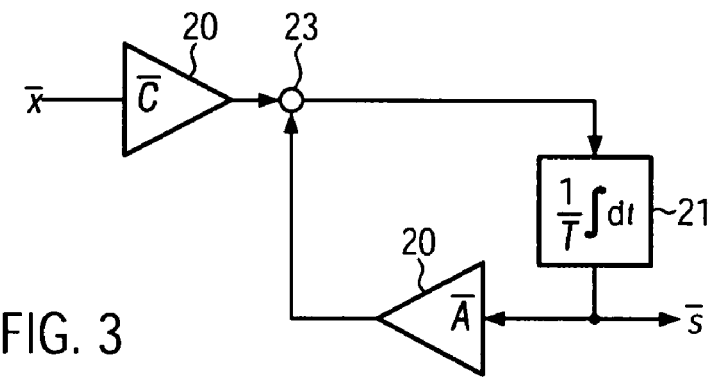
FIG. 3 is a vectorized representation of the emulation of FIG. 2.

Equation (8) can be illustrated by the block diagram of FIG. 2. Such diagram represents the so-called state variable form with the state variables $\tilde{s}_1$ and $\tilde{s}_2$ (outputs of the integrators). In vectorial representation, this produces the block diagram shown in FIG. 3, the factors $\tilde{A}$ and $\mathfrak{C}$ being matrices:

$$\tilde{A} = \begin{bmatrix} -\frac{Td}{m} & 1 \\ -\frac{T^2 k}{m} & 0 \end{bmatrix}; \tilde{C} = \begin{bmatrix} \frac{T^2}{m} & 0 \end{bmatrix}; \tilde{s} = [\tilde{s}_1 \ \tilde{s}_2] \quad (10)$$

The relevant state variable equation is as follows:

$$\tilde{s}(t) = \frac{1}{T}\int_{-\infty}^{t}(\tilde{s}(\tau)\tilde{A} + \tilde{x}(\tau)\tilde{C})d\tau \quad (11)$$

In the drawings, the components characterized by the reference numeral 20 represent operators which multiply corresponding input signals (or states) with the specified factors (or matrices). The components characterized by the reference numeral 21 represent integrators which integrate corresponding input signals on the basis of the specified factors. The components characterized by the reference numeral 22 are delay elements. The components characterized by the reference numeral 23 are summing or subtraction nodes.

1.3 Discretization

Figure 4:
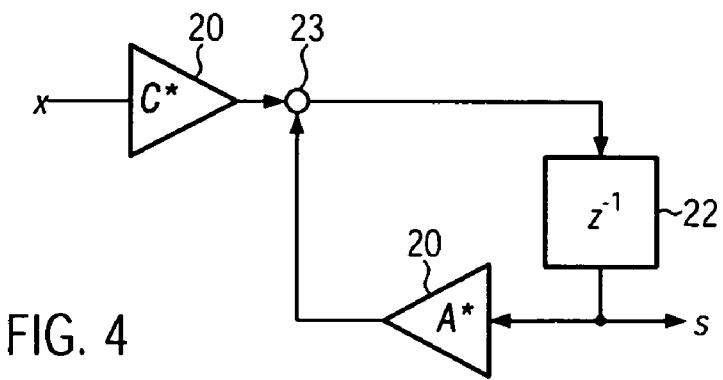
FIG. 4 is a discretized representation of the emulation of FIG. 2.

For the case in which the input signal $\tilde{x}(t)$ and the parameters, i.e. the elements (in the form of the elements of the matrices $\tilde{A}(t)$ and $\tilde{C}(t)$) feature step functions having an incremental width T, the system can be discretized using the discrete signals $$x(n)=\tilde{x}(nT) \tag{12}$$

$$s(n)=\tilde{s}(nT), \tag{13}$$

such that the system can be represented by the block diagram shown in FIG. 4. Accordingly $$A^*(n)=e^{\tilde{A}(nT)} \tag{14}$$

$$C^*(n)=\tilde{C}(nT)(e^{\tilde{A}(nT)}-I)\tilde{A}^{-1}(nT) \tag{15}$$

where I represents the unit matrix. For the matrices specified in equation (10), $A^*$ can be represented in closed form by means of equation (50):

$$A^* = e^{-\frac{Td}{2m}} \begin{bmatrix} \cos(h) - \frac{Td}{2m}si(h) & si(h) \\ -\frac{T^2k}{m}si(h) & \cos(h) + \frac{Td}{2m}si(h) \end{bmatrix}; \tag{16}$$

$$h = T\sqrt{\frac{k}{m} - \frac{d^2}{4m^2}}$$

1.4 Representation by Means of Symmetrical Structure

The transition matrix $A^*$ can be represented according to the equations (40) and (41) as $$A^* = M^{-1}A'M \tag{17}$$

where $$M = \begin{bmatrix} h & 0 \\ -\frac{Td}{2m} & 1 \end{bmatrix} \tag{18}$$

$$M^{-1} = \begin{bmatrix} \frac{1}{h} & 0 \\ \frac{Td}{2mh} & 1 \end{bmatrix} \tag{19}$$

$$A' = e^{-\frac{Td}{2m}} \begin{bmatrix} \cos(h) & \sin(h) \\ -\sin(h) & \cos(h) \end{bmatrix} \tag{20}$$

Figure 5:
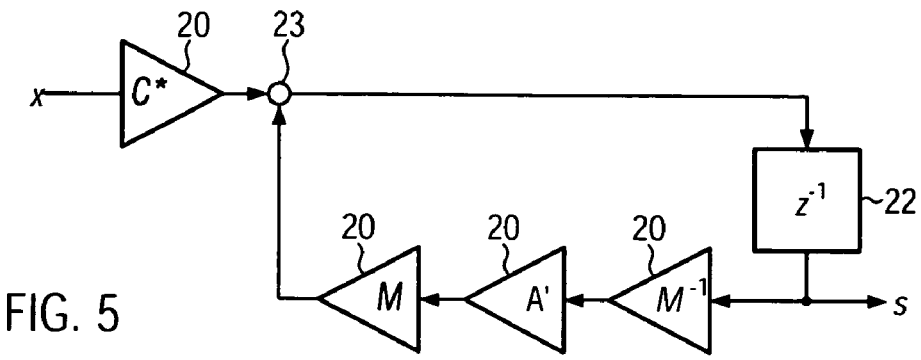
FIG. 5 is a symmetrical discretized representation of the emulation of FIG. 2.
Figure 6:
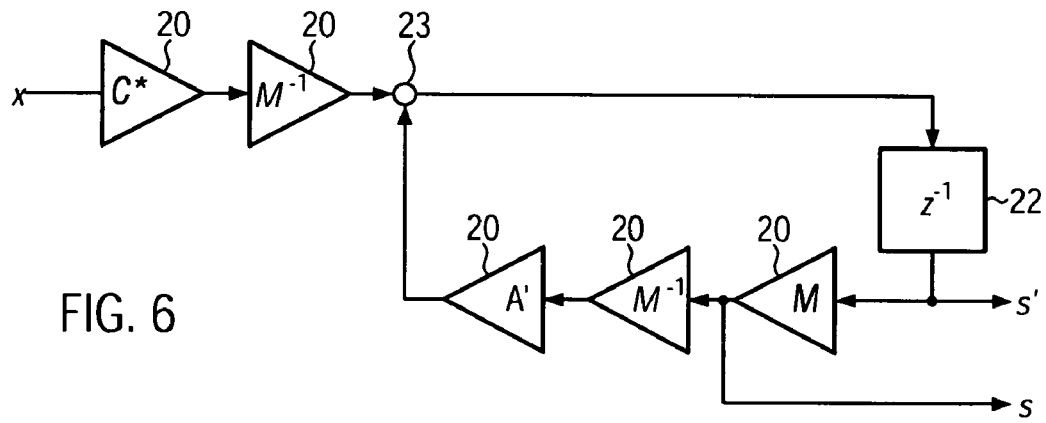
FIG. 6 illustrates a first alternative symmetrical representation of the emulation of FIG. 2.

This produces the block diagram shown in FIG. 5. If the matrices $A^*$, C and therefore M, $M^{-1}$ are constant, M can be displaced relative to the summing node 23 and the delay element 22, thereby producing the block diagram shown in FIG. 6. The following signal is now present at the output of the delay element 22:

$$s'=sM^{-1} \tag{21}$$

Figure 7:
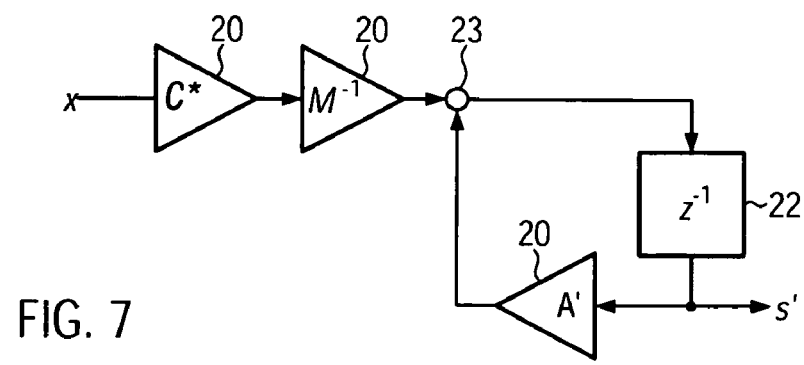
FIG. 7 illustrates a second alternative symmetrical representation of the emulation of FIG. 2.

The chain connection $MM^{-1}=I$ can be suppressed because it represents the unit matrix (FIG. 7). However, the original state vector is lost in this case. Since the transformation equation (21) leaves the second component of the state variables (position variable) unchanged, i.e. because of $s_2=s'_2$, the position variable remains available in the symmetrical system.

The artificially introduced symmetrical structure has the following advantageous property: if the state variable $s'=[s'_1\ s'_2]$ is considered as a complex number (index) $S=S'_1+js'_2$, the matrix multiplication $A's'$ can be reduced to the multiplication of two complex numbers, namely $As$ where $$\underline{A} = e^{-\frac{Td}{2m}}(\cos(h) + j\sin(h)) = e^{-\frac{Td}{2m}+jh} \tag{22}$$

Therefore the die-away process of the system (for x=0) can be specified as follows:

$$s(n+1)=As(n) \tag{23}$$

At each time point, the complex variable s has a well-defined amplitude $|s|$ and phase $\phi=\text{arc}(s)$. In particular, it is also possible to specify the momentary frequency $$\omega = \frac{\varphi(n) - \varphi(n-1)}{T} = \frac{\text{arc}(\underline{A})}{T} \tag{24}$$

which will be significant subsequently for the analysis of the time-dependent case.

1.5 Time-Dependent System and Parametric Effects

In the case of time-dependent effects, such as e.g. a changeable resonance frequency, the above transformations are not allowed. Let:

$$A^*=A^*(n) \tag{25}$$

$$C^*=C^*(n) \tag{26}$$

The following are then time-dependent according to A' and M:

$$A'=A'(n) \tag{27}$$

$$M=M(n) \tag{28}$$

Figure 8:
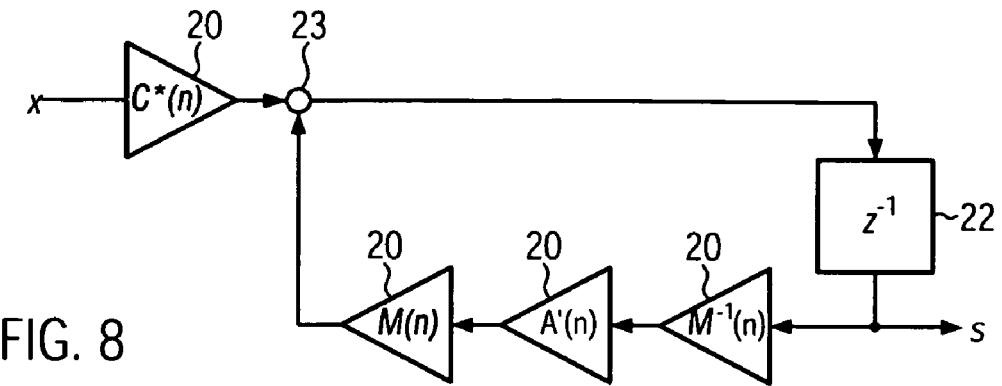
FIG. 8 is a time-dependent illustration of the representation shown in FIG. 5.
Figure 9:
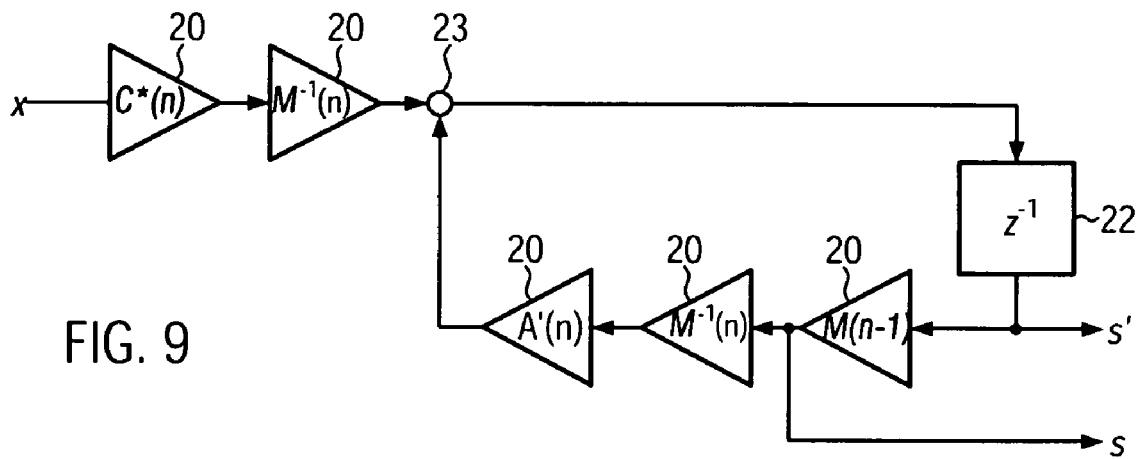
FIG. 9 is a time-dependent illustration of the representation shown in FIG. 6.
Figure 10:
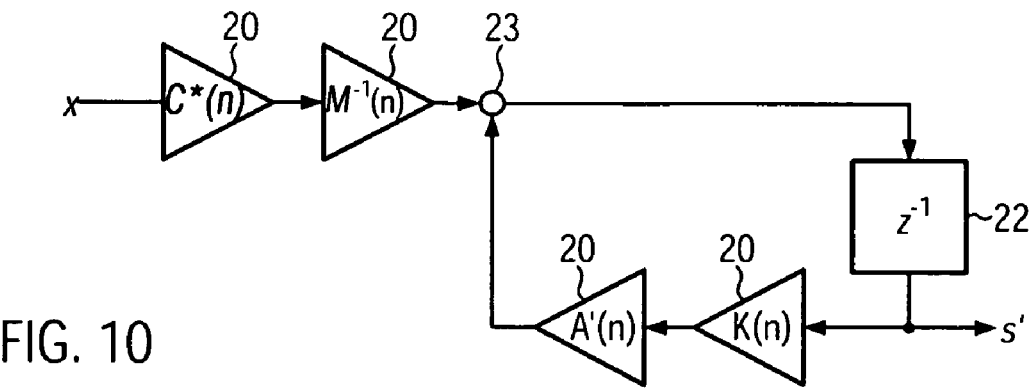
FIG. 10 is a time-dependent illustration of the representation shown in FIG. 7.

If symmetrization is now desired, firstly the system in FIG. 8 is then produced. It is once again possible to move the matrix M(n) past the summing node 23 and the delay element 22. In this case, however, M(n) becomes M(n−1) (FIG. 9). The chain connection $K(n)=M(n-1)M^{-1}(n)$ now (generally) no longer results in the unit matrix, and therefore the structure shown in FIG. 10 is produced. Let it now be assumed that a time dependency is established due to the spring constant k=k(n) being a function of the time. The correction matrix is then produced as follows:

$$K(n) = \begin{bmatrix} \frac{\sqrt{4k(n-1)m - d^2}}{\sqrt{4k(n)m - d^2}} & 0 \\ 0 & 1 \end{bmatrix} \tag{29}$$

It can be seen that the correction matrix for k(n)=k(n−1) is K(n)=I, and this was to be expected.

2. Modulator for the Spring Constant

The claimed entity, which generates an optimal impulse sequence for controlling the spring constants of a vibrator while also achieving an optimal suppression of the parametric effects, is based on the following considerations:

1. The entity includes an exact emulation of the real vibrator for all possible modulation states (two states in this example).

2. This allows simulation of a virtual die-away process assuming a given modulation signal.

3. The entity includes a model of an ideal vibrator at the preferred frequency, and can therefore emulate its state variables according to amount and phase.

4. The entity can determine the error between the state variables of the emulation of the real vibrator and the state variables of the ideal vibrator e.g. according to amount and phase.

5. The entity includes a decision unit which selects the next modulation state such that the error between the emulations of the real and the ideal vibrator is minimized, e.g. by precalculating all possibilities in the next clock cycle(s) and selecting that which has the smallest error.

2.1 Emulation of the Real Vibrator

It will first be shown how, using the above embodiments, an emulation of the real vibrator can be derived for (without restricting the general applicability) the case of two modulation states (a and b) which have two different natural frequencies ($\omega_a$ and $\omega_b$). The matrices $\tilde{A}, A^*, A', M$ therefore assume two values in each case, these being designated by the indices a and b, e.g. $A^*_a, A^*_b$. The diagram in FIG. 11 can be derived on the basis of FIG. 5.

Figure 11:
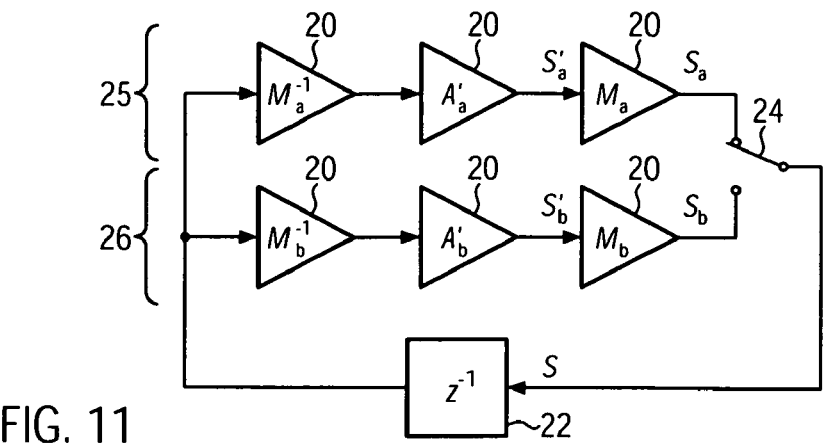
FIG. 11 is an emulation of a mechanical system having vibratory mass for the case of two modulation signals arriving at the vibratory mass.

A first branch 25 and a second branch 26 can be seen in FIG. 11. From an input state s, each branch produces an output state $s_a$ (first branch) or $s_b$ (second branch). By means of the switch 24, one of the output states $s_a$ or $s_b$ is supplied to the delay element 22 and therefore supplied to both branches 25, 26 again as a new input state s in the next clock cycle. Each branch simulates the effect of a modulation signal (represented by $A^*_a, A^*_b$) on the momentary vibration state (represented by the input state s).

Figure 12:
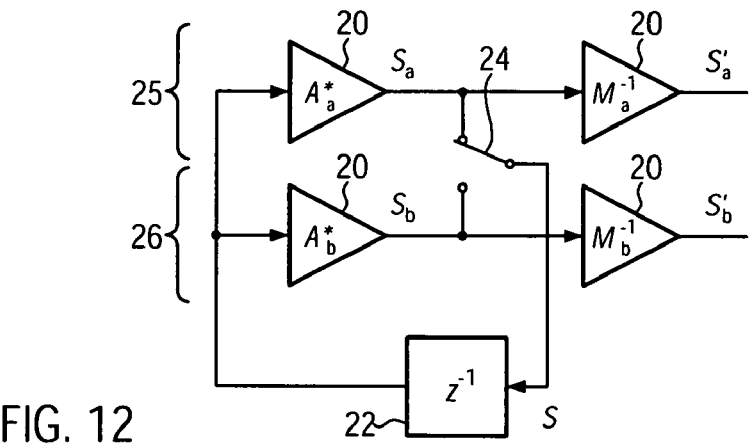
FIG. 12 illustrates an alternative emulation to that shown in FIG. 11.

Since only the die-away process is presently of interest, the input signal x and the matrix C can be excluded from the analysis. Depending on the preferred modulation state, the switch selects either $s_a$ or $s_b$ as a valid state s. The matrices $A'_a$ and $A'_b$ are the transition matrices of the symmetrical system, the preconnected and postconnected matrices $M_{a,b}^{-1}, M_{a,b}$ are the correction matrices which transfer $A'_{a,b}$ into the transition matrices $A^*_{a,b}$ of the original (unsymmetrical) system. Therefore the internal signals $s'_{a,b}$ (these are the states which the symmetrical system would have) are available in addition to the real states $s_{a,b}$. The reason for providing the states of the symmetrical system is that these are particularly suitable as indicators for momentary frequency and momentary amplitude. The decision unit which is discussed below and must select the next switch setting of the switch 24 requires this information as a decision criterion. However, the emulation of the real vibrator can also be realized directly using the transition matrices $A^*_{a,b}$ of the unsymmetrical system without having to forego the symmetrical state variables, as shown in FIG. 12.

2.2 Determining Phase and Amplitude Errors

Figure 13:
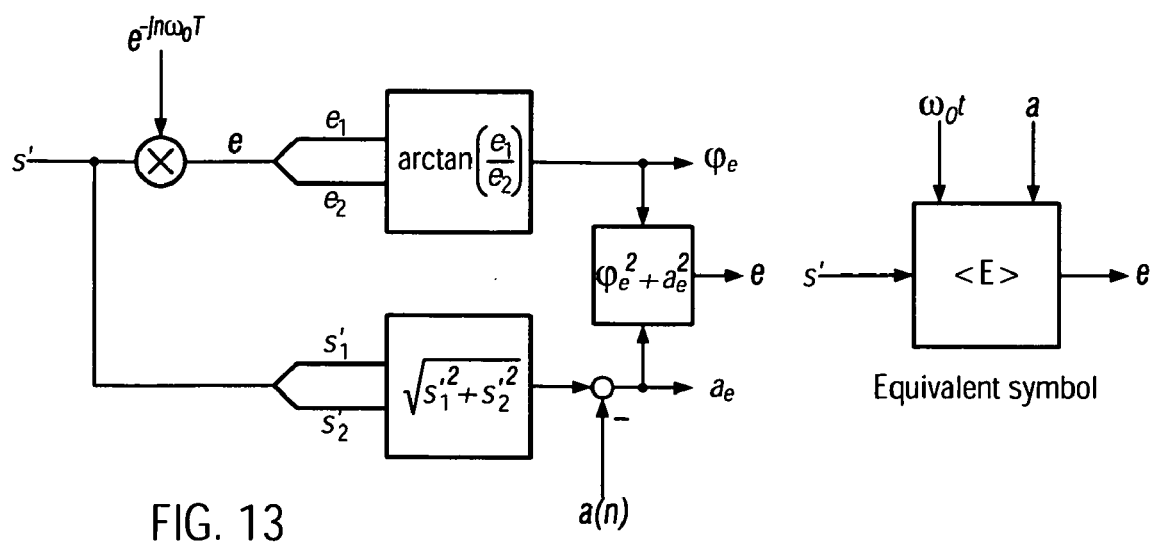
FIG. 13 illustrates a system for detecting phase and amplitude errors.
Figure 14:
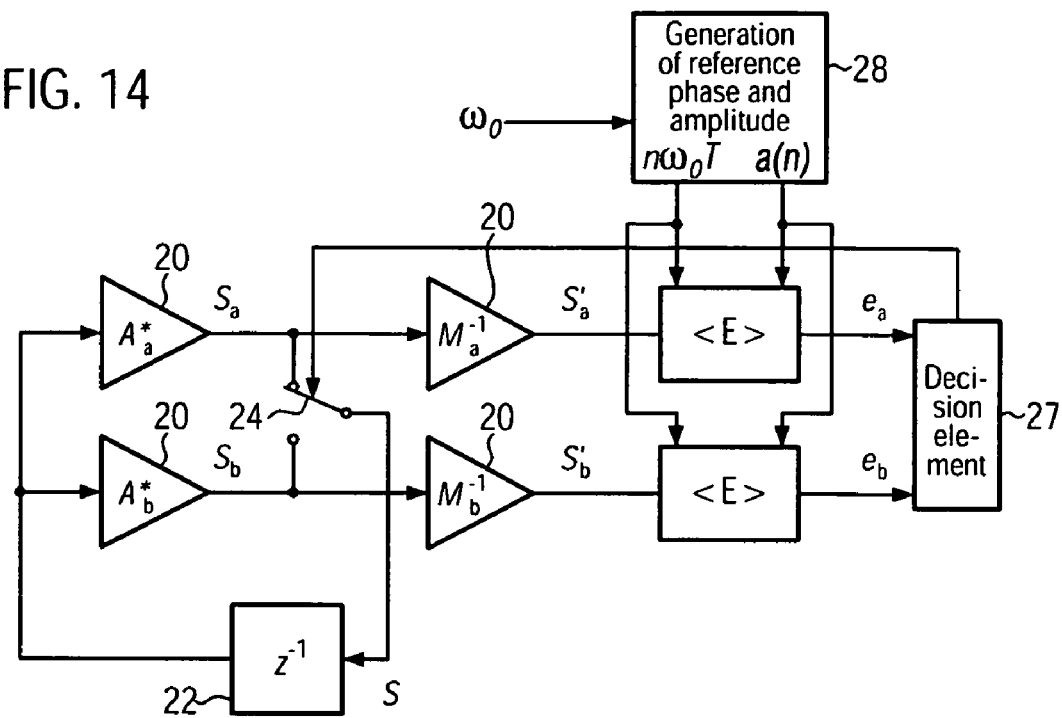
FIG. 14 illustrates an emulation of a mechanical system having vibratory mass, error detection and a decision-making entity.

As mentioned above, the modulation of the spring constants should take place in such a way that the die-away process of the emulation of the real vibrator in terms of amplitude and phase follows a predetermined desired function as accurately as possible. FIG. 13 shows an entity for determining the size of the deviation in the approximation of the build-up process. The input signal s' is the vector of the (symmetrized) state variables of the emulation. Interpreting the state variable vector as a complex index, the phase of the predetermined desired function is subtracted from this by multiplication with $e^{-jn\omega_0 t}$. The result $\{e_1, e_2\}$ is now used to determine the phase $\phi_e$, which is the phase deviation relative to the default. The amplitude of S' is also determined by forming the amount. After subtracting the amplitude a(n) of the default, the amplitude deviation $a_e$ is produced. Finally, a total error e can be derived from the phase deviation and the amplitude deviation, e.g. by producing the sum of the squares of both deviations. A simplified symbolic illustration <E> of the arrangement is shown on the right-hand side of the figure.

The module <E> can therefore be considered as a comparison unit by means of which it is possible to determine an approximation for the deviation between the momentary desired value and the momentary actual value of the resonance frequency, which has to be regulated, of the real vibrator. Furthermore, the module <E> can be considered as a comparison unit by means of which it is possible to determine an exact value (to be precise, a summation of two exact values) for the deviation between the momentary desired value and the momentary actual value of the resonance frequency, which must be regulated, of the vibrator which is emulated in the simulation.

The manner in which the total error e is determined from the input signals of the module <E>, i.e. the functionality of the module <E>, can also be implemented differently; other total error criteria can be used. For example, it is possible to form the difference between s'(n) and the default signal $Ae^{jn\omega_0 t}$ and derive e.g. the amount or its square from this (the signals are considered as complex): $e=|s'(n)-Ae^{jn\omega_0 t}|$ or $e=|s'(n)-Ae^{jn\omega_0 t}|^2$.

2.3 Decision Element for the Modulation Entity

In order to be able to determine the modulation signal for the spring constants, i.e. in order to be able to specify the setting of the switch in the emulation for the next clock cycle, the two possible future symmetrized states $S'_a$ and $s'_b$ are analyzed using two blocks <E> in respect of the error relative to the default signal. A post-connected decision element 27 compares the two errors $e_a$ and $e_b$ and, as a next switch setting, selects that which measures the state with the smaller error. A reference generator 28 for phase and amplitude, whose frequency $\omega_0$ can be set, generates the reference phase $n\omega_0 T$ and the reference amplitude a(n), which correspond to the values of the ideal vibrator. a(n) is an exponentially decaying function having a time constant which depends on the quality factor of the ideal vibrator, i.e. $\alpha=a(n)/a(n+1)>1$ is a constant value. The illustrated arrangement now controls the switch such that the die-away process of the emulation follows the default on average in amount and phase. The spring constant of the real vibrator can therefore be controlled using the modulation signal which is generated by the decision element, with the result that this real switched vibrator emulates an ideal non-switched vibrator having the resonance frequency $\omega_0$.

The proposed system has two deficiencies. One is of a practical nature and the other relates to principle. The practical deficiency relates to the fact that the amplitude of the signal of the emulation, which follows the amplitude of the default signal, is an exponentially decaying function. As a result, the signals become ever smaller until correct functioning is no longer possible due to the occurrence of numerical problems. This problem can be resolved by multiplying the relevant signals with the reciprocal value of the decaying exponential function. The generated modulation signal remains the same in this context. This is achieved by multiplying the transition matrices $A^*_a$ and $A^*_b$ with the above-cited factor $\alpha$. This has the effect of deattenuating the emulation. The default amplitude then becomes constant a(n)=1 and therefore no longer has to be generated by the reference generator. It should be noted that the real physical vibrator being controlled in this context is not deattenuated as a result of this, since the modulation signal remains unaffected by this measure. The measure is merely intended to insure the numerically stable continuous operation of the modulation signal generator.

The matrices can also be determined directly from the deattenuated system (d=0); the factor α is omitted in this case. The deattenuation of the emulation results in simplified equations for the matrices A* and M$^{-1}$. Because d=0, it now follows that $$h = \omega T; \omega = \sqrt{\frac{k}{m}} \tag{30}$$

In this context, ω is the momentary resonance frequency of the emulation. Hence $$\tilde{A} = \begin{bmatrix} 0 & 1 \\ -\omega^2 T^2 & 0 \end{bmatrix} \tag{31}$$

$$A^* = \begin{bmatrix} \cos(\omega T) & \frac{\sin(\omega T)}{\omega T} \\ -\omega T \sin(\omega T) & \cos\omega T \end{bmatrix} \tag{32}$$

$$M^{-1} = \begin{bmatrix} -\frac{1}{\omega T} & 0 \\ 0 & 1 \end{bmatrix} \tag{33}$$

The matrices $A^*_a$, $A^*_b$ and $M_a^{-1}$, $M_b^{-1}$ are derived from $A^*$ and $M^{-1}$, by replacing ω with $\omega_a$, $\omega_b$ there.

Figure 16:
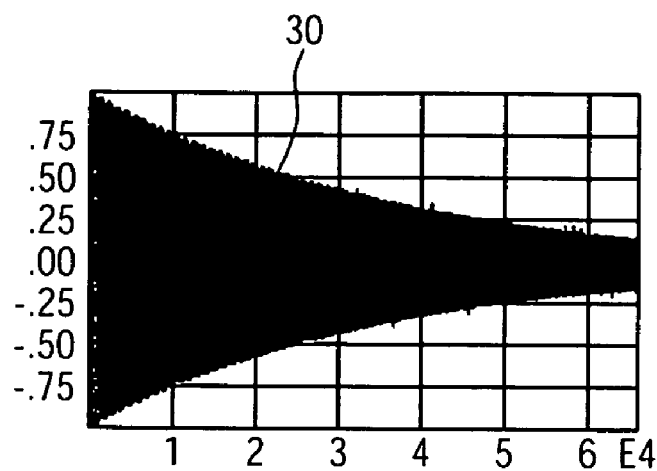
FIG. 16 is a graph of a die-away process of the vibratory mass of a mechanical system with the phase matching that simulated in an emulation.
Figure 17:
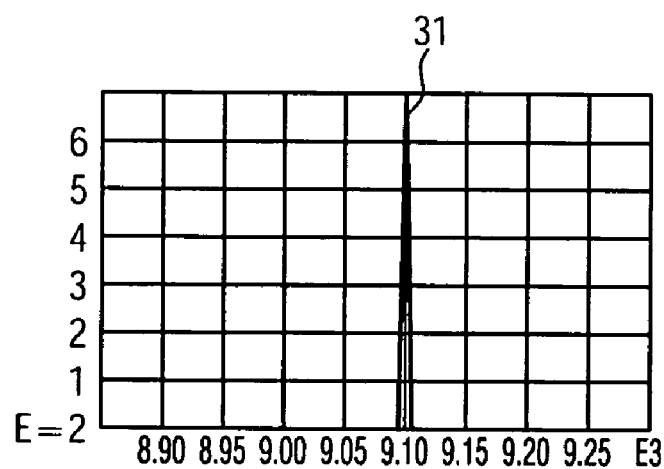
FIG. 17 is a graph of the spectrum of the die-away process of FIG. 16.
Figure 18:
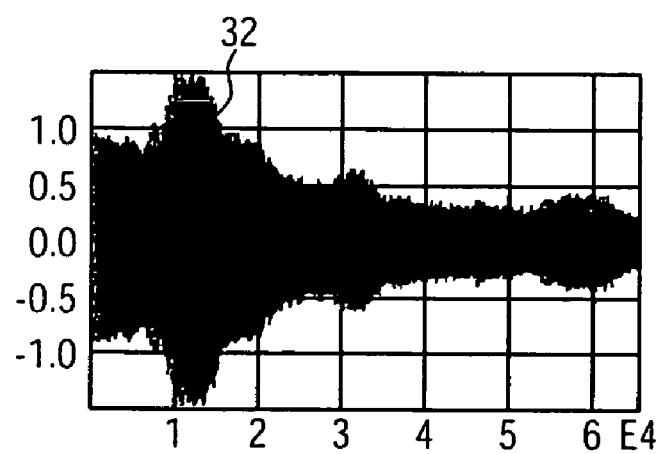
FIG. 18 is a graph of a die-away process of the vibratory mass of a mechanical system when the phase does not match the phase simulated in the emulation of the mechanical system.

The result of a simulation using the proposed system will now be discussed. The ratios were selected such that the real physical vibrator could be switched to a natural resonance of 9000 Hz or 9200 Hz by means of the switchable spring constants. A frequency default of 9100 Hz was selected for the simulation. The initial conditions were selected such that the phases of the real vibrator and emulation were identical. The real vibrator was then left alone; the associated die-away process 30 is illustrated in FIG. 16. It is clear that a good exponential die-away process is produced, and, if this function is subjected to a Fourier transformation, a sharp resonance peak 31 occurs at 9100 Hz (FIG. 17). However, if the simulation is repeated and the real vibrator is not started in phase with the build-up process that is simulated in the emulation, this results in an uncontrolled profile 32 of the envelope curve as shown in FIG. 18. It is therefore clear that it is not sufficient to allow the simulated die-away process to occur in only one phase position.

2.4 Simultaneous Emulation of the Die-Away Process in Two Phase Positions which are Displaced by π/2

Figure 15:
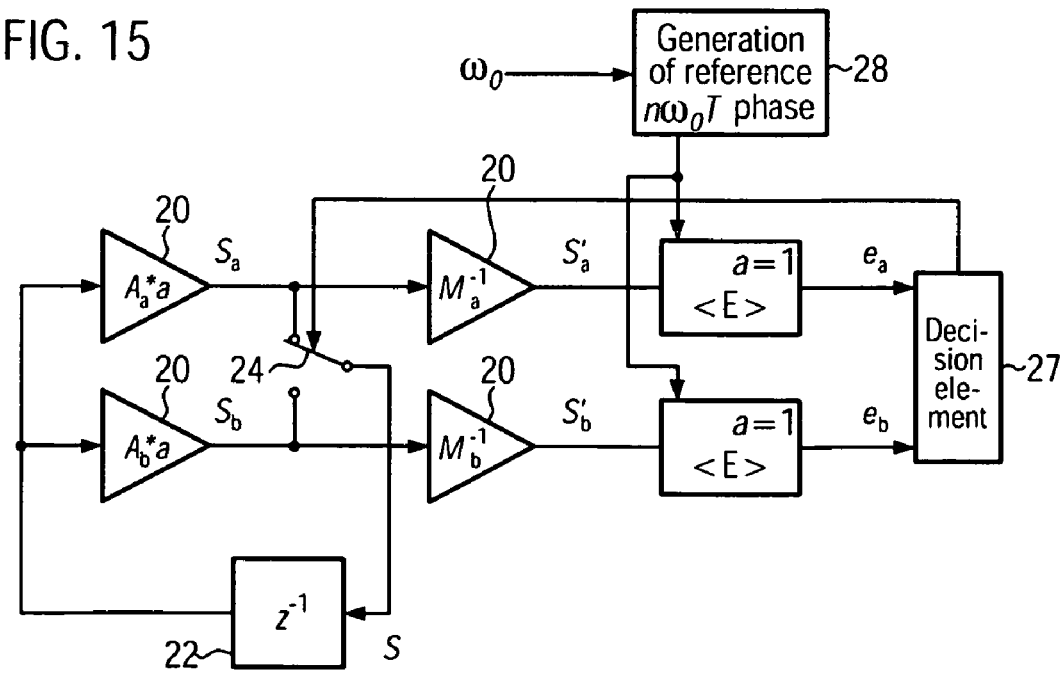
FIG. 15 illustrates the emulation of FIG. 14 with additional internal deattenuation.
Figure 19:
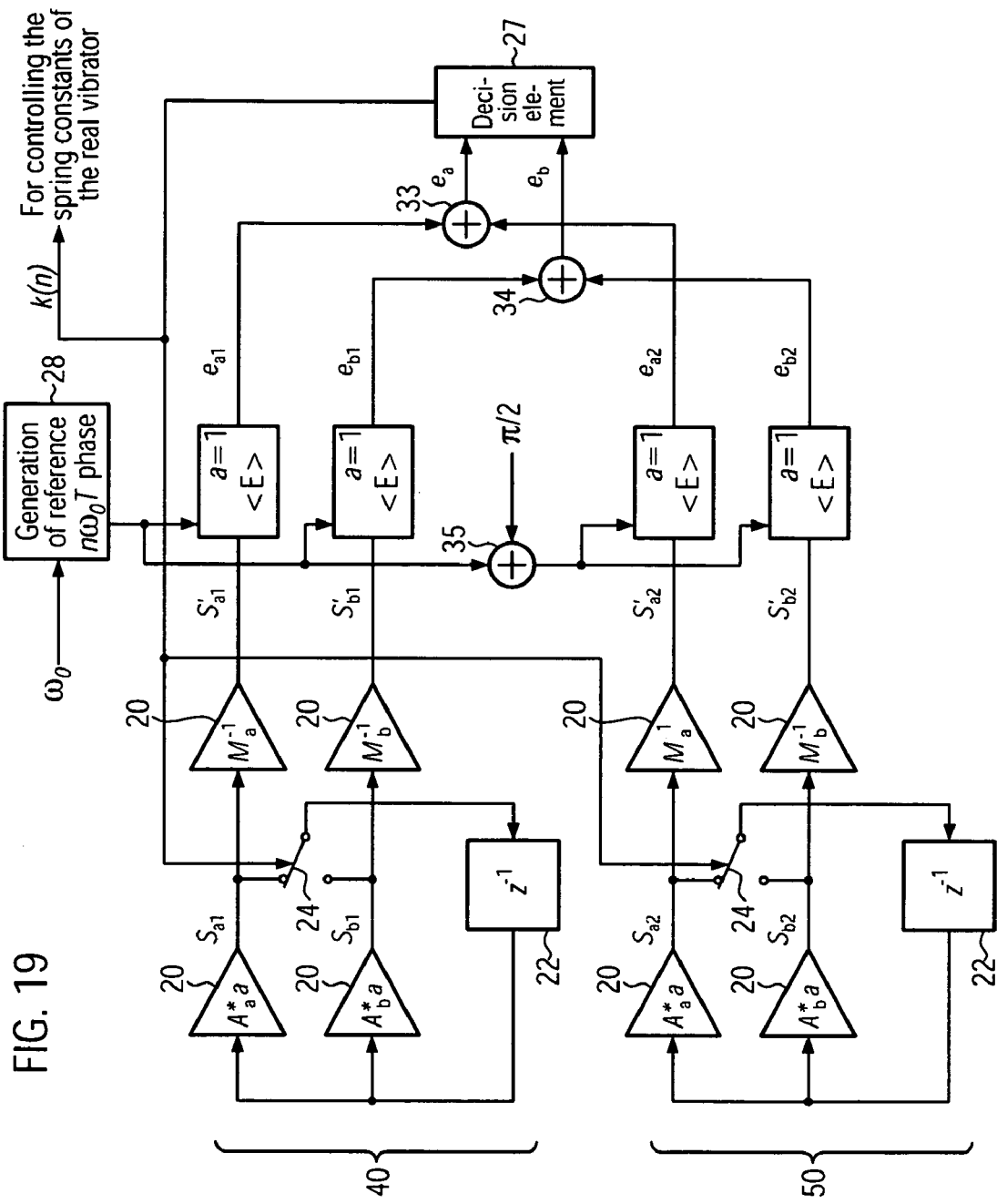
FIG. 19 illustrates a system with two phase-shifted emulations of a vibratory mass of a mechanical system.

The cited deficiency can be overcome by providing two emulations for generating the modulation signal. Two build-up processes that are displaced in phase by π/2 run in the emulations. The phases and amplitudes of the build-up processes are simultaneously monitored and controlled by providing an aggregate error criterion for the decision element (FIG. 19). It can be seen that the emulation (the system shown in FIG. 15) is present twice, as are the paired error analysis modules <E>. The first emulation is signified by the reference numeral 40, and the second by the reference numeral 50. For the lower emulation, a constant value of π/2 is added for the phase default, such that its die-away process always runs with this phase shift. For the decision element, the relevant errors in the switch states a and b must be combined by simply adding them, for example. If this arrangement is now used to control the spring constant of the real vibrator, the die-away process of the vibrator runs correctly in each phase position, and this can be verified by means of simulation. The signal k(n) can be used for controlling the pulse modulator.

In other words: two vibration responses of the resonator are simulated simultaneously, with such responses resulting from exposure of the sensors to a modulation signal sequence in which, for each of the vibration responses, amplitude and phase of the vibration response are simultaneously regulated to specific desired values/desired value profiles, and the desired phase of the one vibration response is shifted relative to the desired phase of the other vibration response by π/2. The displacement of the desired phase is achieved by the summing node 35. For each generatable modulation signal, the two simulations are each assigned an effective total deviation (in the first emulation: ea1 for the first modulation signal, and eb1 for the second modulation signal; in the second emulation: ea2 for the first modulation signal, and eb2). This is derived from the sum of the deviations (sum of ea1 and ea2 or of eb1 and eb2 for the second modulation signal) between the momentary desired values of the simulation and corresponding values regulated in the simulation that would result from maintenance of the modulation signal or from switching over to the modulation signal. The effective total deviations relating to the same modulation signal from both simulations are then added (via the summing nodes 33 and 34), to produce the sums $e_a$ and $e_b$. That modulation signal is selected for which the sum ($e_a$ or $e_b$) calculated in the previous step is smallest.

Essential aspects of the invention are briefly summarized again: in the case of micromechanical systems, it is often desirable to tune the natural frequency of a vibrator electrically by controlling an electrostatic spring. As a result of demanding requirements relating to the degree of miniaturization and power consumption, it is desirable to dispense with analog control and the DA converter that is required in this context. A possible alternative is a digital pulse modulation method in which the impulses that switch the electrostatic spring constants between two extreme values are temporally distributed in a suitable manner. An analysis shows that it is not sufficient to use a simple distribution method that insures that the average frequency of the impulses corresponds to the relative position of the desired frequency within the extreme values. In order to solve this problem, a method is proposed in which a simulated die-away process of an emulation follows the required die-away process of the real vibrator as accurately as possible with respect to the specified quality and frequency. The unspecified parameter in this approximation is the desired impulse sequence generated by the approximation process. It has been shown that approximation of the die-away process must be performed by two emulations simultaneously having two phase positions which are shifted by π/2. It has also been shown that it is possible, without changing the result, to switch to deattenuated systems for the emulations, in which continuous operation of the pulse modulator is possible. The electrostatic spring(s) of the real vibrator are controlled in the specified manner by the impulses generated and the resonance frequency of the real vibrator can then be set in the desired manner. Parametric effects are effectively suppressed.

In the foregoing description, the inventive "run through all possibilities principle" (made possible by the finite combination possibility of discrete impulses) was explained with reference to regulation of resonance frequency. The following will discuss how this principle can also be used to regulate the excitation vibration/readout vibration. With reference to FIG.

20, for example, it is first explained how excitation vibration/readout vibration can be regulated without applying the "run through" principle.

Figure 20:
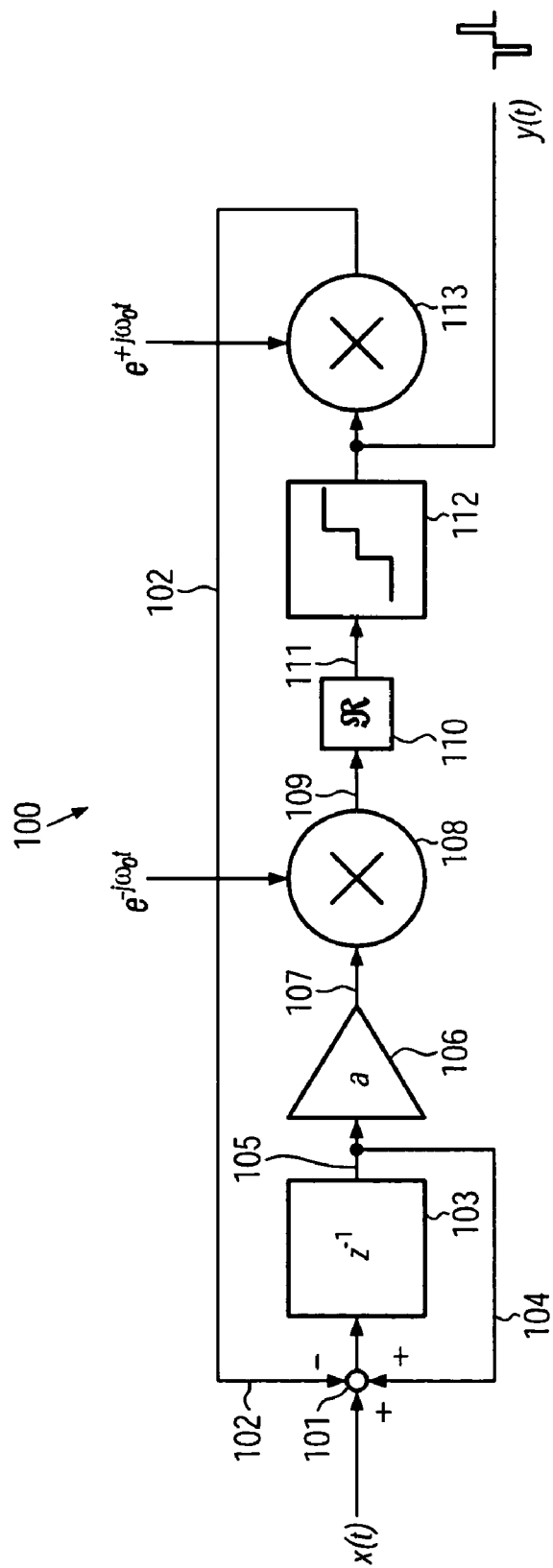
FIG. 20 illustrates the structure of a known ternary pulse modulator.

FIG. 20 shows a complex illustration of a possible embodiment 100 of a pulse modulator.

The complex input signal x(t) comprises a real part and an imaginary part, both of which are represented as digital values. In the adder node 101, the complex feedback signal 102 is subtracted from the complex input signal x(t), wherein the difference between these two complex signals represents the regulating deviation. In addition, the (likewise complex) content of the delay element 103 is added to this difference in the adder node 101. The content of the delay element 103 is supplied to the adder node 101 via the signal line 104. The delay element 103 and the signal line 104 together form a complex integrator stage which integrates the complex regulating deviation, i.e. the difference between input signal and feedback signal. The integrated signal 105 is amplified in the amplifier stage 106 according to the factor "a" and the amplified signal 107 is supplied to the first multiplier stage 108. There, the amplified signal 107 is multiplied by the complex mixed signal $e^{-j\omega_0 t}$ thereby obtaining the signal 109 which is up-mixed to the frequency $\omega_0$. The block 110 determines the real part of the complex up-mixed signal 109, and the thus obtained real part 111 of the up-mixed signal is made available to the quantizer 112.

In the embodiment shown in FIG. 20, the quantizer 112 is implemented as a ternary quantizer which, with the aid of comparators, converts the relevant input signal into the three possible values −1, 0, +1 of a pulse signal. The quantized pulse signal y(t) generated in this manner can be picked up at the output of the quantizer 112. In order to generate the complex feedback signal 102, the real-value pulse signal y(t) is multiplied by the complex-conjugate mixed signal $e^{+j\omega_0 t}$ in the second multiplier stage 113. The complex feedback signal 102, which is thus obtained by multiplication of a real and a complex number, is supplied to the adder node 101 at the input of the circuit. In this way, a corresponding modulation signal sequence, which resets the readout vibration of the resonator R or produces an excitation of the excitation vibration of the resonator R, is generated from the complex compensation signal x(t) (pulse signal y(t) corresponds to the signals S1 and S2 in FIG. 1).

Figure 22:
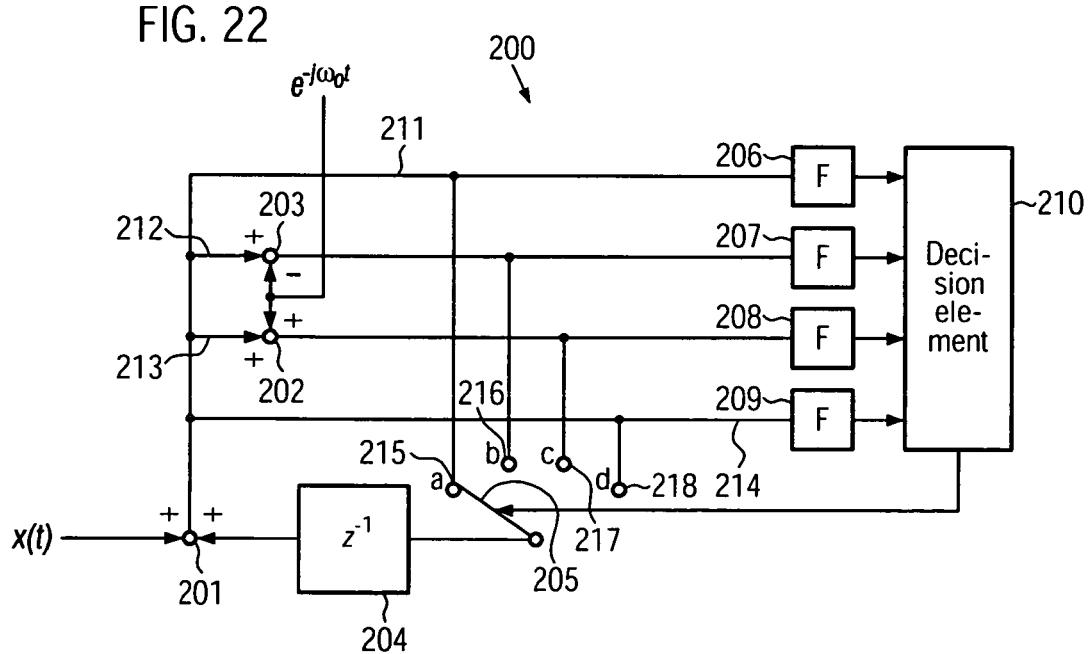
FIG. 22 illustrates the structure of a modified ternary pulse modulator.

The pulse modulator 100 has the disadvantage that the quantization method used by the pulse modulator 100 is not suitable for combination with methods for regulating other physical variables (e.g. a method for regulating the resonance frequency of a resonator). These disadvantages can be avoided if the pulse modulator 200 shown in FIG. 22 is used instead of the pulse modulator 100 shown in FIG. 20. This is discussed in the following description.

Figure 21:
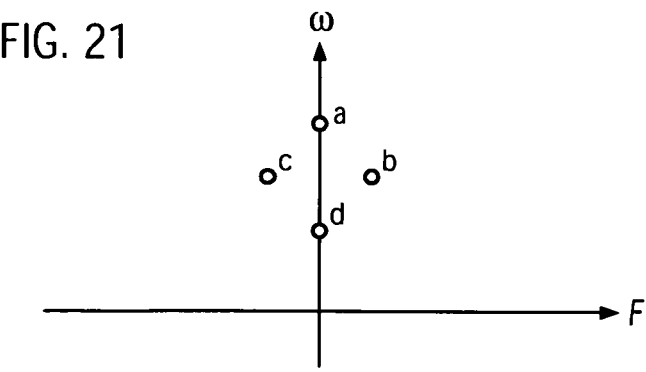
FIG. 21 is a plot of the interrelationship of forces and resonance frequencies for a mechanical resonator at which four modulation signals can arrive.

Assumed is a (micromechanical) resonator including a moving electrode which is arranged symmetrically in relation to two control electrodes $E_1$ and $E_2$. By applying an electrical voltage to the control electrodes, on the one hand it is possible to exert a force on the moving electrode and therefore on the resonator, and, on the other hand, the resonance frequency of the vibrator can also be influenced by the control electrodes. It is assumed that a voltage of either 0 or $U_0$ is present at the electrodes. The four combinations of forces and resonance frequencies that are possible in this context are given in the following table (see also FIG. 21):

| Modulation state/modulation signal | $E_1$ | $E_2$ | Force | Frequency |
|---|---|---|---|---|
| a | 0 | 0 | 0 | $\omega_a$ |
| b | 0 | $U_0$ | $F_0$ | $\omega_b$ |
| c | $U_0$ | 0 | $-F_0$ | $\omega_c$ |
| d | $U_0$ | $U_0$ | 0 | $\omega_d$ |

Assuming complete symmetry, it normally applies here that $\omega_a > \omega_b = \omega_c > \omega_d$.

The forces $F \in \{-F_0, 0, F_0\}$ specified in the above table imply a ternary excitation, i.e. the use of a pulse modulator whose output signals are ternary quantized. Therefore the pulse modulator shown in FIG. 20 can be used in principle for regulating the amplitudes/phases of the excitation vibration/readout vibration of the resonator. As indicated above, however, the pulse modulator must be modified if a plurality of physical variables are to be simultaneously regulated. For simultaneous regulation of excitation vibration/readout vibration and resonance frequency via the same control electrodes according to the invention, a decision element which operates on the basis of an error criterion is used instead of the quantizer 112 of FIG. 20.

FIG. 22 shows a preferred embodiment of a corresponding regulating unit 200 which could be used instead of the pulse modulator 100 for regulating the amplitude and phase of the excitation vibration/readout vibration of the resonator. The regulating unit 200 has a first summing node 201, a second summing node 202, a third summing node 203, a delay element 204, a switch element 205, a first to fourth error block 206 to 209 and a decision element 210. An essential difference in comparison to the pulse modulator 100 shown in FIG. 20 is that, instead of the quantizer 112, the decision element 210 is used. The input signal x(t) is initially applied on signal lines 211 to 214, wherein the signal $e^{-j\omega_0 t}$ is added to the signal x(t) in summing node 202 and the signal $e^{-j\omega_0 t}$ is subtracted from the signal x(t) in summing node 203. Correspondingly modified/unchanged signals are supplied to the error blocks 206 to 209 which determine the deviation of the supplied signals from the momentary desired value of the input signal x(t) or convert the supplied signals such that corresponding deviations can be identified by the decision element 210. Corresponding error signals (output signals of the error blocks 206 to 209) are supplied to the decision element 210 which, by analyzing the error signals, decides which input signal of the error blocks 206 to 209 exhibits the least deviation from the momentary desired value, and controls the switch element 205 such that the input signal of the relevant error block for which the determined deviation is smallest is applied to the input of the delay element 204 (one of the signals present at the pick-offs 215 to 218).

The signal, which is stored in the delay element 204 in the momentary clock cycle, is supplied to the node 201 in the next clock cycle, wherein the node adds the signal to the input signal x(t). Each of the pick-offs 215 to 218 corresponds to a modulation state/modulation signal a), b), c) and d) listed in the above table. This means that, if the pick-off 216 is connected to the input of the delay element 204, the resonator R is exposed to the modulation signal b) (i.e. the force $F_0$ is applied to the control electrodes), if the pick-off 217 is connected to the input of the delay element 204, the resonator R is exposed to the modulation signal c) (i.e. the force $-F_0$ is applied to the control electrodes), etc.

Figure 23:
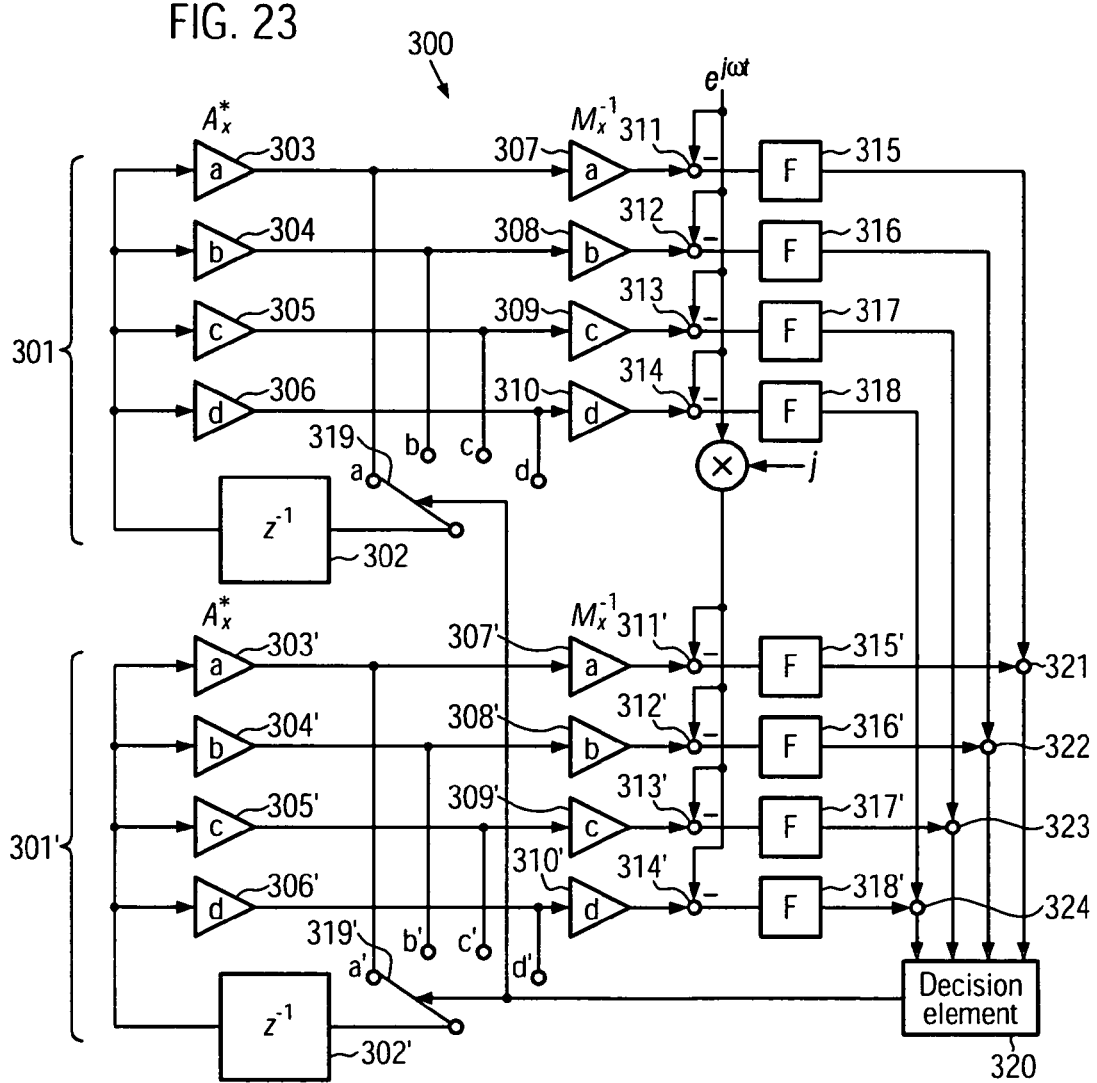
FIG. 23 illustrates the structure of a preferred embodiment of an entity for tuning the resonance frequency of a mechanical resonator.

The functionalities of the regulating units 100, 200 shown in FIGS. 20 and 23 are similar. In both regulating units, an integrated error between the complex default signal (input signal) x(t) and the down-mixed (by $-\omega_0$) modulation signal is minimized. In FIG. 20, the error is again up-mixed and ternary quantized in order to achieve this, wherein the quantizer 112 determines the modulation state. This results in a closed control loop that minimizes the integrated error. In FIG. 23, however, at a specific time point all possible modulation states a) to d) are tried and analyzed with respect to the integrated error occurring in each case. For the states a) and d), the modulation signal (more precisely: the force) is zero in this embodiment, and, therefore, the integrated error (up to x(t)) remains unchanged, while in the states b) and c) the down-mixed modulation signal is subtracted/added. For all modulation states a) to d), the complex integrated error is analyzed by error blocks 206 to 214. As a result, the decision element 210 finds the optimal modulation state a), b), c) or d) and sets the switch element 205 to the corresponding position, such that the integration of the error with one of the signals present at the pick-offs 215 to 218 can take place according to a selected modulation state. At the same time, the corresponding modulation signal according to the table is generated by an impulse generating unit (not shown), said unit being controlled by the decision element 210, and applied to the resonator. The signals can be two-dimensional or complex signals. The error blocks 206 to 214 form e.g. the square of the absolute value of their input signal and forward corresponding signals to the decision element 210.

The above description proposes a method for excitation of a mechanical vibrator using digital impulses. It has also been shown how the resonance frequency of such a vibrator can be tuned by means of digital impulses at specific electrodes which control an electrostatic spring constant. The following description will show how both methods can be combined, i.e. how the regulation of the resonance frequency of the resonator can be combined with the excitation/compensation of vibrations of the resonator using only two electrodes.

The above description already describes a method which provides a control signal for a switchable spring constant, such that a resonator composed of a mass and a switchable spring approximates as accurately as possible a resonator having a predetermined resonance frequency. FIG. 19 shows a regulating system which can switch between two resonance frequencies. Since in the regulating unit 200 shown in FIG. 22 it is necessary to switch between three different resonance frequencies in the event that $\omega_b = \omega_c$ and even between four resonance frequencies in the event that $\omega_b \neq \omega_c$ (see table above), the regulating system shown in FIG. 19 must be correspondingly expanded if the regulating system shown in FIG. 19 is to be combined with the regulating system shown in FIG. 22.

The regulating unit 300 shown in FIG. 23 provides a possible solution: The unit 300 features a first branch 301 and a second branch 301'. The first branch 301 features a delay element 302, a first to fourth operator 303 to 306, a fifth to eighth operator 307 to 310, a first to fourth subtracting node 311 to 314, a first to fourth error block 315 to 318, and a switch element 319. Similarly, the second branch 301' features a delay element 302', a first to fourth operator 303' to 306', a fifth to eighth operator 307' to 310', a first to fourth subtracting node 311' to 314', a first to fourth error block 315' to 318', and a switch element 319'.

Assume that the output signal of the delay element 302 represents the momentary state of the simulated vibration process of the resonator. The output signal is supplied to the inputs of the operators 303 to 306, wherein each operator simulates the influence of one of the four generatable modulation signals on the momentary state of the vibration simulation. The output signals of the operators 303 to 306 are transformed by means of the operators 307 to 310 into a form that is suitable for the error analysis, the signal $e^{-j\omega_0 t}$ is subtracted from each of the transformed signals (at the summing nodes 311 to 314), and the signals obtained thus are supplied to the error blocks 315 to 318. The error blocks 315 to 318 determine the deviation or a measure for the deviation of the output signals generated by the operators 303 to 306 from the momentary desired value ($e^{-j\omega_0 t}$) and forward corresponding deviation signals to adding nodes 321 to 324. The letters a), b), c) and d) signify the relevant modulation state, as specified in the above table, whose influence on the resonator is to be tested.

The functionality of the second branch 301' corresponds to that of the first branch 301. The deviation signals determined by the error blocks 315' to 318' in the second branch 301' are likewise forwarded to the adding nodes 321 to 324. In each adding node 321 to 324, a deviation signal generated by the first branch 301 is added to a deviation signal generated by the second branch 301', wherein deviation signals relating to the same modulation signal (modulation state) are added in each adding node. The added deviation signals are supplied to the decision element 320.

The two branches 301 and 301' differ only in that the signal subtracted in the subtracting nodes 311 to 314 features a phase shift of preferably $\pi/2$ in relation to the signal subtracted in the subtracting nodes 311' to 314'. The decision element 320 controls the switch elements 319 and 319' simultaneously and in such a way that the output signal which comes from the operators 303 to 306 or 303' to 306' and whose associated deviation signal, summed with the corresponding deviation signal of the respective other branch, has the least deviation relative to the momentary desired value ($e^{-j\omega_0 t}$) in respect of amplitude and phase is applied to the input of the delay element 302 or 302'. In this context, $\omega_0$ represents the resonance frequency to which the resonator is to be regulated.

When the pick-off (331/331') is connected to the input of the delay element 302/302', the resonator R is exposed to the modulation signal b) (i.e. the force $F_0$ is present at the control electrodes). When the pick-off 332)/332') is connected to the input of the delay element 302/302', the resonator R is exposed to the modulation signal c) (i.e. the force $-F_0$ is present at the control electrodes), etc.

Therefore two natural vibration profiles of the resonator are simulated simultaneously (a natural vibration process is simulated in each of the branches 301, 301'), wherein each natural vibration process is compared with relevant desired values/desired value profiles ($e^{-j\omega_0 t}$) with respect to amplitude and phase, and the desired phase of the one natural vibration process is shifted by $\pi/2$ relative to the desired phase of the other natural vibration process, wherein
  for each generatable modulation signal, a total deviation is assigned to the two simulations (deviation signal which is generated by the error blocks 315-318 or 315'-318'), said total deviation being obtained from the sum of the deviations between the momentary desired values and corresponding simulation values for amplitude and phase, that would result from the maintenance of this modulation signal or the switching over to this modulation signal,
  the total deviations relative to the same modulation signal from both simulations are added (in the adding nodes 321 to 324), wherein the decision element 320 ensures that the resonator is exposed to that modulation signal (a), b), c) or d)) for which the corresponding total deviation sum results in the best approximation of the desired value profile.

A deattenuated system is preferably simulated in the two feedback branches 301, 301' in this case. Provision is made for a reference carrier $e^{j\omega t}$ which is the default for the build-up process in the upper loop. For the lower loop, the reference carrier is multiplied by j, thereby producing a phase shift of π/2. The matrices $A^*_x$, $M_x^{-1}$, x=a,b,c,d, take the form:

$$A^*_x = \begin{bmatrix} \cos(\omega_x t) & \sin(\omega_x t)/(\omega_x t) \\ -\omega_x t \sin(\omega_x t) & \cos(\omega_x t) \end{bmatrix}; M_x^{-1} = \begin{bmatrix} -1/\omega_x t & 0 \\ 0 & 1 \end{bmatrix}$$

Figure 24:
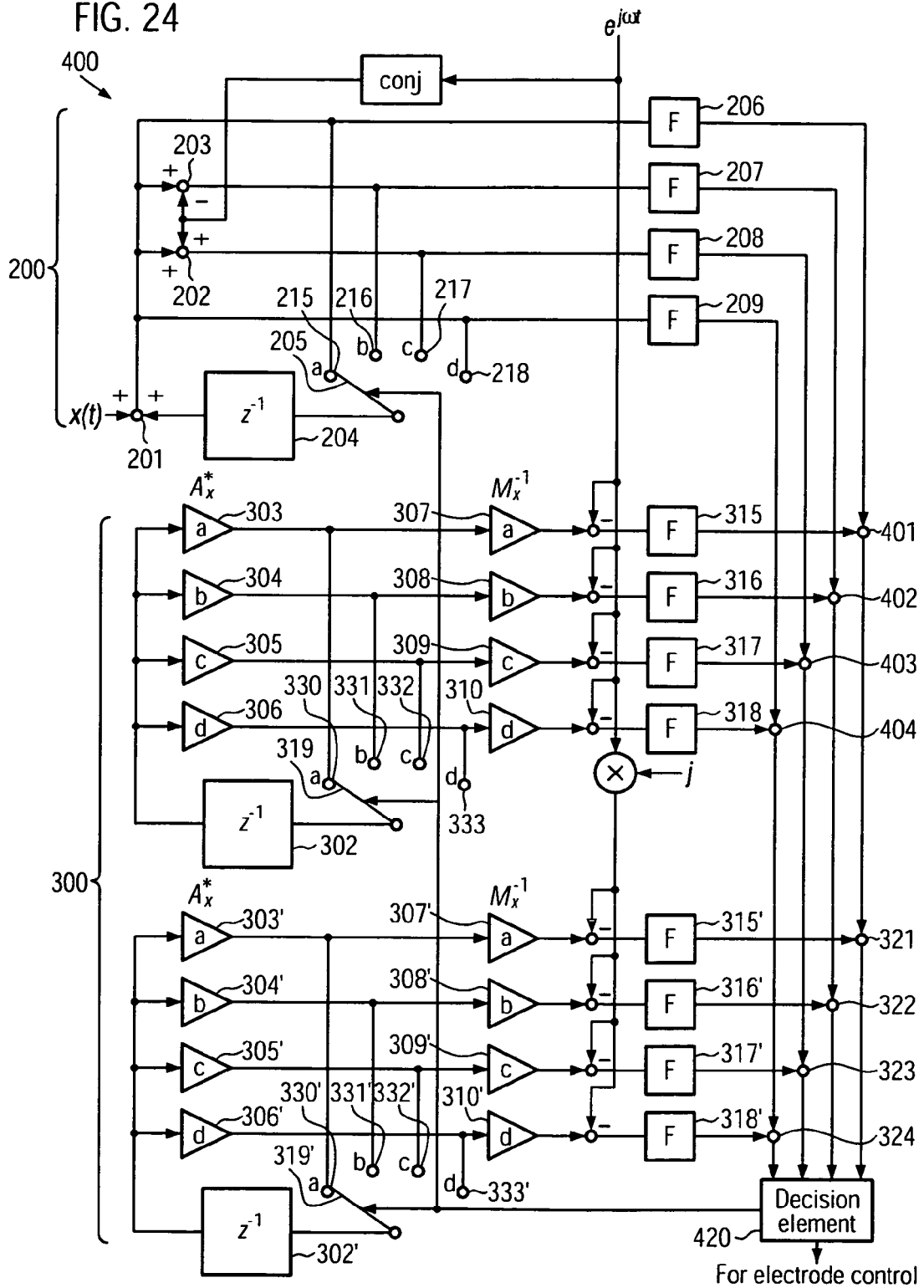
FIG. 24 illustrates a first preferred embodiment of an entity for simultaneously regulating resonance frequency and excitation or compensation signals of a mechanical resonator.

FIG. 24 shows a regulating entity 400 in which the regulating units 200 and 300 from FIGS. 22 and 23 are combined together to form a single unit by means of which both the resonance frequency ω and the amplitude/phase of the excitation vibration/readout vibration of the resonator can be regulated simultaneously to specified values.

In the regulating entity 400, the deviation signals which were generated by the error blocks 206 to 209 are added to the deviation signals which were generated by the error blocks 315 to 318 in the summing nodes 401 to 404. The output signals of the summing nodes 401 to 404 are in turn added to the deviation signals which were generated by the error blocks 315 to 318. Only deviation signals relating to the same modulation signal are added, and therefore "global" deviation signals are obtained for each generatable modulation signal.

An aggregate error criterion is therefore applied by adding the "individual errors" which were determined by the regulating units 200, 300 for the specified states a), b), c) and d). The state having the smallest aggregate error is selected by the decision element 420 and determines the present modulation state and the switch setting (the switches 205, 319 and 319' are switched simultaneously and in an identical manner). Because the aggregate error is kept as small as possible, priority of regulation is always given to that physical variable which contributes most to the aggregate error, i.e. has the greatest "regulation need".

The error blocks 206 to 209, 315 to 318, and 315' to 318' can be configured differently in order to weight relevant deviation signals differently. The individual errors for the regulation of the resonance frequency and for the regulation of the excitation vibration/readout vibration could be weighted differently, for example, or form the amount and phase deviation relative to the default function, and derive an error criterion therefrom. The excitation takes place via the (complex) baseband signal x(t), separated according to in-phase and quadrature components, by up-mixing to the resonance frequency ω. The tuning to this frequency ω can only be done precisely if the parameters of the real vibrator (e.g. $\omega_a, \omega_b, \omega_c, \omega_d$) are known with sufficient accuracy. If this is not the case, the elements of the matrices $A^*_x$ and $M_x^{-1}$, x=a,b,c,d can be regulated to the correct values by means of additional secondary control loops (i.e. $\omega_a, \omega_b, \omega_c, \omega_d$ are determined and the matrices $A^*_x$ and $M_x^{-1}$, x=a,b,c,d are formed accordingly).

Figure 25:
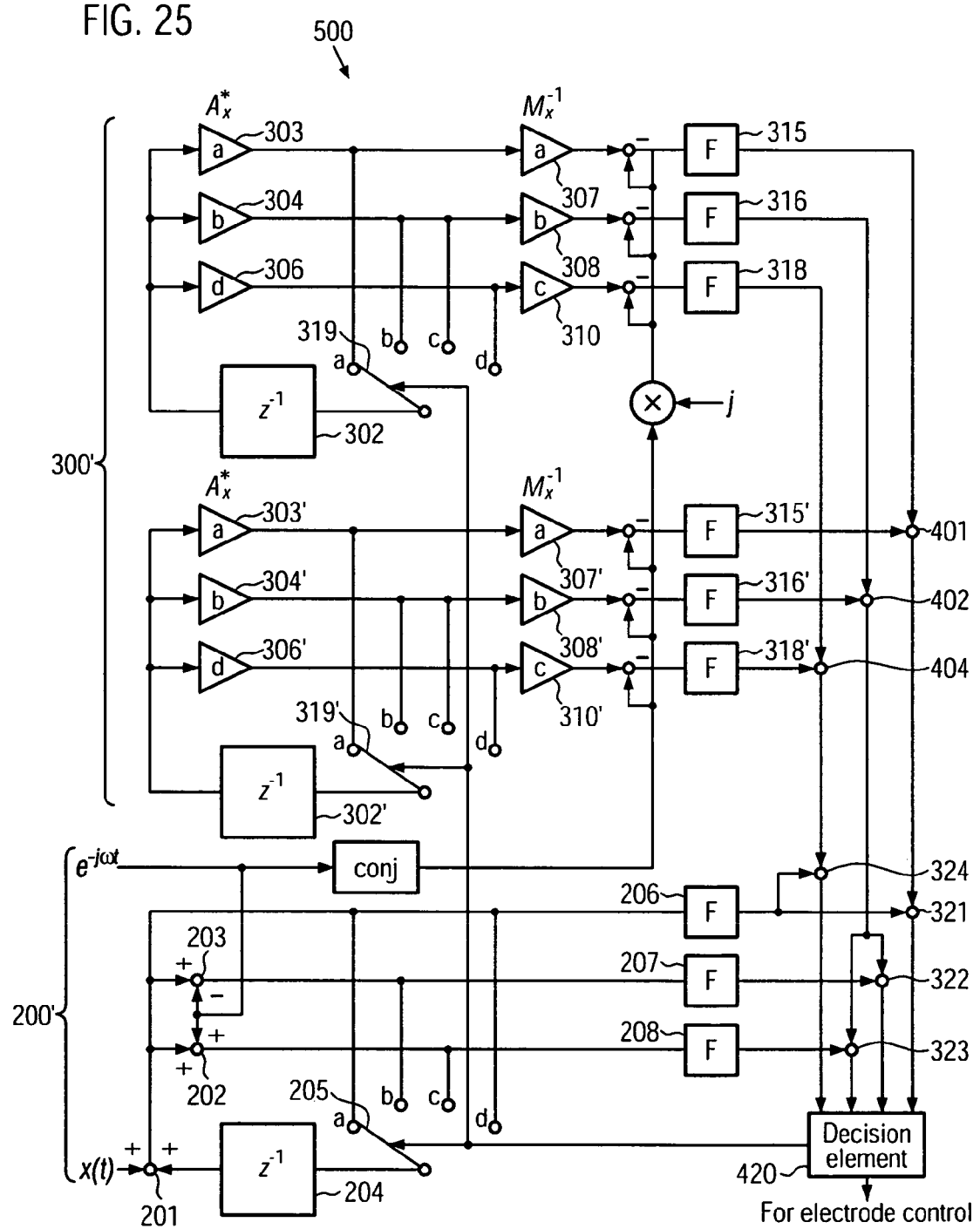
FIG. 25 is a second embodiment of an entity for controlling both resonance frequency and excitation or compensation signal of a mechanical resonator in accordance with the invention.

In the case of symmetrical electrodes, $\omega_b = \omega_c$ and $F_a = F_d = 0$. This fact can be exploited for developing a simplified system because identical system components are economized: FIG. 25 shows a regulating unit 500 which is composed of a regulating unit 200' and a regulating unit 300'. In the regulating unit 300', the effect of the modulation signal c) on the simulated natural vibration process is not examined since the effect is identical to that which the modulation signal b) would have on the simulated natural vibration process. In the regulating unit 200', the effect of the modulation signal d) on the vibration process of the resonator is not examined because it is identical to the effect which the modulation signal a) would have on the vibration process of the resonator. The configurations of the adding nodes are correspondingly different.

While the invention has been described with reference to a presently-preferred embodiment, it is not limited thereto. Rather it is only limited insofar as it is defined by the following set of patent claims and includes within its scope all equivalents thereof.

Annex 1: Conversion of the General into a Symmetrical State Variable Form

Assumed is the transition matrix A of a general discrete system of the 2nd order:

$$A = \begin{bmatrix} a_{11} & a_{12} \\ a_{21} & a_{22} \end{bmatrix} \quad (34)$$

Furthermore let $$g = \frac{a_{22} - a_{11}}{2} \quad (35)$$

$$f = g^2 + a_{12}a_{21} \quad (36)$$

$$h = \sqrt{|f|} \quad (37)$$

$$b_1 = \frac{a_{12}}{h} \quad (38)$$

$$b_2 = \frac{g}{h} \quad (39)$$

Then for $f < 0$ where $$M = \begin{bmatrix} \frac{1}{b_1} & 0 \\ -\frac{b_2}{b_1} & 1 \end{bmatrix}; \quad M^{-1} = \begin{bmatrix} b_1 & 0 \\ b_2 & 1 \end{bmatrix} \quad (40)$$

gives the transition matrix A' of the symmetrical system:

$$A' = M \cdot A \cdot M^{-1} = \begin{bmatrix} c & h \\ -h & c \end{bmatrix} \quad (41)$$

where $$c = \frac{a_{11} + a_{22}}{2} \quad (42)$$

where $$N = \begin{bmatrix} \frac{1}{\sqrt{2}} & \frac{j}{\sqrt{2}} \\ \frac{j}{\sqrt{2}} & \frac{1}{\sqrt{2}} \end{bmatrix}; \quad N^{-1} = \begin{bmatrix} \frac{1}{\sqrt{2}} & \frac{-j}{\sqrt{2}} \\ \frac{-j}{\sqrt{2}} & \frac{1}{\sqrt{2}} \end{bmatrix} \quad (43)$$

hence $$A'' = N \cdot M \cdot A \cdot M^{-1} \cdot N^{-1} = N \cdot A' \cdot N^{-1} = \begin{bmatrix} c - jh & 0 \\ 0 & c + jh \end{bmatrix} \quad (44)$$

(Jordan normal form).

Annex 2: Exponentiation of a Quadratic Matrix of the 2nd Order

Assumed is a quadratic matrix of the 2nd order:

$$A = \begin{bmatrix} a_{11} & a_{12} \\ a_{21} & a_{22} \end{bmatrix} \quad (45)$$

Furthermore let $$g = \frac{a_{22} - a_{11}}{2} \quad (46)$$

$$f = g^2 + a_{12}a_{21} \quad (47)$$

$$h = \sqrt{|f|} \quad (48)$$

$$c = \frac{a_{11} + a_{22}}{2} \quad (49)$$

Then for $f < 0$:

$$e^A = e^c \begin{bmatrix} \cos(h) - g\frac{\sin(h)}{h} & a_{12}\frac{\sin(h)}{h} \\ a_{21}\frac{\sin(h)}{h} & \cos(h) + g\frac{\sin(h)}{h} \end{bmatrix}$$

$$= e^c \left( \cos(h) \begin{bmatrix} 1 & 0 \\ 0 & 1 \end{bmatrix} + \frac{\sin(h)}{h} \begin{bmatrix} -g & a_{12} \\ a_{21} & g \end{bmatrix} \right) \quad (50)$$

and for $f > 0$:

$$e^A = e^c \begin{bmatrix} \cosh(h) - g\frac{\sinh(h)}{h} & a_{12}\frac{\sinh(h)}{h} \\ a_{21}\frac{\sinh(h)}{h} & \cosh(h) + g\frac{\sinh(h)}{h} \end{bmatrix}$$

$$= e^c \left( \cosh(h) \begin{bmatrix} 1 & 0 \\ 0 & 1 \end{bmatrix} + \frac{\sinh(h)}{h} \begin{bmatrix} -g & a_{12} \\ a_{21} & g \end{bmatrix} \right) \quad (51)$$

Assuming $$cox(f) = \begin{cases} \cos(\sqrt{-f}) & f < 0 \\ 1 & f = 0 \\ \cosh(\sqrt{f}) & f > 0 \end{cases} \quad (52)$$

$$six(f) = \begin{cases} \frac{\sin(\sqrt{-f})}{\sqrt{-f}} & f < 0 \\ 1 & f = 0 \\ \frac{\sinh(\sqrt{f})}{\sqrt{f}} & f > 0 \end{cases} \quad (53)$$

gives for $e^A$:

$$e^A = e^c \left( cox(f) \begin{bmatrix} 1 & 0 \\ 0 & 1 \end{bmatrix} + six(f) \begin{bmatrix} -g & a_{12} \\ a_{21} & g \end{bmatrix} \right) \quad (54)$$

The invention claimed is:

1. A method for controlling/regulating a physical variable of a physical system, in particular of a dynamic system, to a specific desired value/desired value profile using a pulse modulator by means of which a sequence of discrete modulation signals is generated, wherein said signals effect the control/regulation of the physical variable, characterized by the repeated execution of the following steps:
   a) determining an exact value or an approximation for the deviation between the momentary desired value and the momentary actual value of the physical variable,
   b) determining the respective change in the deviation which would result from the maintenance of the momentary modulation signal or the switching over to the other modulation signals,
   c) generating that modulation signal which results in the best approximation of the momentary desired value; and then
   d) applying said modulation signal to a resonator arranged to control/regulate said physical variable of said physical system.

2. The method as claimed in claim 1, characterized in that the system is a micromechanical sensor which has a resonator.

3. The method as claimed in claim 2, characterized in that the physical variable which must be controlled/regulated is a resonance frequency of the resonator.

4. The method as claimed in claim 2, characterized in that the physical variable which must be controlled/regulated is the amplitude/phase of a vibration of the resonator.

5. The method as claimed in claim 3, characterized in that in order to regulate the resonance frequency of the resonator, the resonator vibration response which results from the arrival of a modulation signal sequence at the resonator is simulated, and the modulation signal sequence is selected such that a maximally accurate approximation of a desired value profile for a vibration of the resonator is produced in the simulation, wherein the frequency of the desired value profile for the vibration is the resonance frequency which must be regulated, and that the resonator is exposed to the modulation signal sequence which is obtained thus.

6. The method as claimed in claim 5, characterized in that the generation of the modulation signal sequence for regulating the resonance frequency is achieved by simultaneously regulating amplitude and phase of the vibration response to specific desired values/desired value profiles in the simulation, wherein:
   a) an effective total deviation is calculated for each generatable modulation signal, said total deviation being obtained from the sum of the deviations between the momentary desired values and corresponding values as regulated in the simulation, which would result from the maintenance of the modulation signal or the switching over to the modulation signal,
   b) that modulation signal is selected for which the calculated effective total deviation is smallest,
   c) the steps a) and b) are iteratively repeated.

7. The method as claimed in claim 5, characterized in that two vibration responses of the resonator are simulated simultaneously, said responses resulting from the arrival at the resonator of a modulation signal sequence, wherein for each of the vibration responses, amplitude and phase of the vibration response are simultaneously regulated to specific desired values/desired value profiles, and the desired phase of the one vibration response is shifted relative to the desired phase of the other vibration response by the phase $\pi/2$, wherein
   a) for each generatable modulation signal, the two simulations are each assigned an effective total deviation which is derived from the sum of the deviations between the momentary desired values of the simulation and corresponding values which are regulated in the simulation, which would result from the maintenance of the modulation signal or the switching over to the modulation signal,
   b) the effective total deviations relating to the same modulation signal from both simulations are added,
   c) that modulation signal is selected for which the sum which is calculated in the previous step is smallest,
   d) the steps a) to c) are iteratively repeated.

8. A device for controlling/regulating a physical variable of a physical system, in particular of a dynamic system, to a specific desired value/desired value profile, which device features a pulse modulator by means of which a sequence of discrete modulation signals can be generated, wherein said signals effect the control/regulation of the physical variable, characterized by a) a comparison unit by means of which it is possible to determine an exact value or an approximation for the deviation between the momentary desired value and the momentary actual value of the physical variable,
- b) a calculation unit which is connected to the comparison unit and by means of which it is possible to calculate the relevant changes in the deviation, as determined by the comparison unit, which would result from the maintenance of the momentary modulation signal or the switching over to the other modulation signals,
- c) a decision unit which is connected to the calculation unit and, depending on the deviation changes calculated by the comparison unit, decides which modulation signal results in the best approximation of the momentary desired value, wherein the modulation signal sequence which is generated by the pulse modulator can be controlled by the decision unit.

9. A method for simultaneously controlling/regulating at least two physical variables of a physical system, in particular a dynamic system, to specific desired values/desired value profiles using a pulse modulator which generates a sequence of discrete modulation signals, said sequence effecting the control/regulation of the physical variables, wherein:
- a) an effective total deviation is calculated for each generatable modulation signal, said total deviation being obtained from the sum of the exact values or the approximations for the deviations between the momentary desired values and corresponding actual values of the physical variables, which would result from the maintenance of this modulation signal or the switching over to this modulation signal,
- b) that modulation signal which has the smallest calculated effective total deviation is used for the regulation, then
- c) applying said modulation signal to a resonator for controlling/regulating at least two physical variables of said physical system, and
- d) the steps a) through c) are iteratively repeated.

10. The method as claimed in claim 9, characterized in that the system is a micromechanical sensor which has a resonator.

11. The method as claimed in claim 10, characterized in that the physical variables to be controlled/regulated are resonance frequencies or amplitudes/phases of the excitation vibration/readout vibration of the resonator.

12. The method as claimed in claim 11, characterized in that when regulating the resonance frequency of the resonator, resonance frequency deviation approximations relating to this, said approximations being determined in step a), are ascertained as follows:
- a natural vibration process of the resonator, which the resonator would execute under specific vibration initial conditions and after exposure to the modulation signals previously generated by the pulse modulator, is simulated,
- the effect which each generatable modulation signal would have on the simulated natural vibration process of the resonator is calculated, and the hypothetically resulting natural vibration profiles are compared with a natural vibration desired value profile which has the same vibration initial conditions and whose vibration frequency is the resonance frequency that must be regulated,
- wherein the deviations between the hypothetically resulting natural vibration profiles and the natural vibration desired value profile represent the resonance frequency deviation approximations that must be determined.

13. The method as claimed in claim 12, characterized in that the comparison of the hypothetically resulting natural vibration profiles with the natural vibration desired value profile includes the comparison of corresponding amplitudes and phases of the profiles, wherein
- a total deviation is calculated for each generatable modulation signal, said total deviation being obtained from the sum of the deviations between the momentary desired values and corresponding simulation values for amplitude and phase, which would result from the maintenance of this modulation signal or the switching over to this modulation signal respectively,
- the total deviations represent the resonance frequency deviation approximations which must be determined.

14. The method as claimed in claim 13, characterized in that two natural vibration processes of the resonator are simulated simultaneously, wherein each natural vibration process is compared with relevant desired values/desired value profiles in respect of amplitude and phase, and the desired phase of the one natural vibration process is shifted relative to the desired phase of the other natural vibration process by the phase $\pi/2$, wherein
- for each generatable modulation signal, a total deviation is assigned in each case to the two simulations, said total deviation being obtained from the sum of the deviations between the momentary desired values and corresponding simulation values for amplitude and phase, which would result from the maintenance of this modulation signal or the switching over to this modulation signal respectively,
- the total deviations relating to the same modulation signal from both simulations are added up, wherein the sums which were calculated in the previous step represent the resonance frequency deviation approximations which must be determined.

15. An entity for simultaneously controlling/regulating at least two physical variables of a physical system, in particular a dynamic system, to specific desired values/desired value profiles, said entity featuring a pulse modulator by means of which it is possible to generate a sequence of discrete modulation signals that effect the control/regulation of the physical variables, characterized by
- a calculation unit which, for each generatable modulation signal, calculates an effective total deviation which is derived from the sum of the exact values or the approximations for the deviations between the momentary desired values and corresponding actual values of the physical variables, which would result from the maintenance of this modulation signal or the switching over to this modulation signal,
- a decision unit which is connected to the calculation unit and, depending on the effective total deviations calculated by the calculation unit, decides for which modulation signal the calculated effective total deviation would be smallest, wherein the modulation signal sequence which is generated by the pulse modulator is controlled by the decision unit.

16. The method as claimed in claim 6, characterized in that two vibration responses of the resonator are simulated simultaneously, said responses resulting from the arrival at the resonator of a modulation signal sequence, wherein for each of the vibration responses, amplitude and phase of the vibration response are simultaneously regulated to specific desired values/desired value profiles, and the desired phase of the one vibration response is shifted relative to the desired phase of the other vibration response by the phase $\pi/2$, wherein
a) for each generatable modulation signal, the two simulations are each assigned an effective total deviation which is derived from the sum of the deviations between the momentary desired values of the simulation and corresponding values which are regulated in the simulation, which would result from the maintenance of the modulation signal or the switching over to the modulation signal,
b) the effective total deviations relating to the same modulation signal from both simulations are added,
c) that modulation signal is selected for which the sum which is calculated in the previous step is smallest,
d) the steps a) to c) are iteratively repeated.

* * * * *